(12) United States Patent
Mensch et al.

(10) Patent No.: US 9,746,570 B2
(45) Date of Patent: Aug. 29, 2017

(54) VIRTUAL MARINE SEISMIC SPREAD ACQUISITION

(71) Applicant: CGG SERVICES SA, Massy (FR)

(72) Inventors: Thomas Mensch, Paris (FR); Damien Grenié, Limours (FR); Risto Siliqi, Paris (FR)

(73) Assignee: CGG SERVICES SAS, Massy (FR)

( * ) Notice: Subject to any disclaimer, the term of this patent is extended or adjusted under 35 U.S.C. 154(b) by 0 days.

(21) Appl. No.: 14/892,037

(22) PCT Filed: Jun. 6, 2014

(86) PCT No.: PCT/EP2014/061919
§ 371 (c)(1),
(2) Date: Nov. 18, 2015

(87) PCT Pub. No.: WO2014/195505
PCT Pub. Date: Dec. 11, 2014

(65) Prior Publication Data
US 2016/0109600 A1    Apr. 21, 2016

Related U.S. Application Data

(60) Provisional application No. 61/954,820, filed on Mar. 18, 2014, provisional application No. 61/832,462, filed on Jun. 7, 2013.

(51) Int. Cl.
*G01V 1/38* (2006.01)

(52) U.S. Cl.
CPC ......... *G01V 1/3808* (2013.01); *G01V 1/3817* (2013.01); *G01V 2210/165* (2013.01)

(58) Field of Classification Search
CPC ............... G01V 1/3817; G01V 1/3808; G01V 2210/165
USPC ..................................................... 367/15, 20
See application file for complete search history.

(56) References Cited

U.S. PATENT DOCUMENTS

| 5,761,152 A | 6/1998 | Jacobsen et al. |
| 2007/0159921 A1 | 7/2007 | Regone et al. |
| 2011/0158044 A1 | 6/2011 | Moldoveanu et al. |
| 2012/0014212 A1 | 1/2012 | Eick et al. |
| 2012/0320711 A1 | 12/2012 | Hite |

(Continued)

OTHER PUBLICATIONS

C. Mason et al., "Use of Narrow Azimuth Data for Enhanced Wavefield Extrapolation Multiple Prediction on a WAZ. Survey", SEG 79th International Exposition and Annual Meeting, Houston, Oct. 25-29, 2009, pp. 3118-3122.*

(Continued)

*Primary Examiner* — Daniel L Murphy
(74) *Attorney, Agent, or Firm* — Patent Portfolio Builders PLLC

(57) ABSTRACT

Presented are methods and a system for efficiently acquiring seismic data based on a virtual seismic spread. A streamer vessel and a source vessel are used in combination and in a specific spatial arrangement collect seismic data. The source arrays can be fired simultaneously, creating blended seismic data that is separated with a deblending algorithm or sequentially to collect seismic data directly. The virtual seismic spread can be configured to reduce survey time or decrease capital costs and health safety and environment exposure based on the size of the streamer array towed by the streamer vessel.

20 Claims, 18 Drawing Sheets

(56) References Cited

U.S. PATENT DOCUMENTS

2013/0121109 A1   5/2013   Baardman et al.
2013/0121110 A1   5/2013   Trad et al.
2014/0303898 A1   10/2014  Poole

OTHER PUBLICATIONS

International Search Report in related International Application No. PCT/EP2014/061919, mailed Apr. 13, 2015.
S. Baldock et al., "Orthogonal Wide Azimuth Surveys: Acquisition and Imaging", SEG Technical Program Expanded Abstracts, Sep. 30, 2011, pp. 147-151, XP055164664.
E. Fromyr et al., "An Exploration-Scale Wide Azimuth Towed Streamer Case Study", SEC Technical Program Expanded Abstracts, Nov. 14, 2008, pp. 1008-1012, XP055164662.
A. Long et al., "Multi-Azimuth and Wide-Azimuth Lessons for Better Seismic Imaging in Complex Settings", Proceedings of the 8th SEGJ International Symposium, Dec. 31, 2006, pp. 1-4, XP055164663.

\* cited by examiner

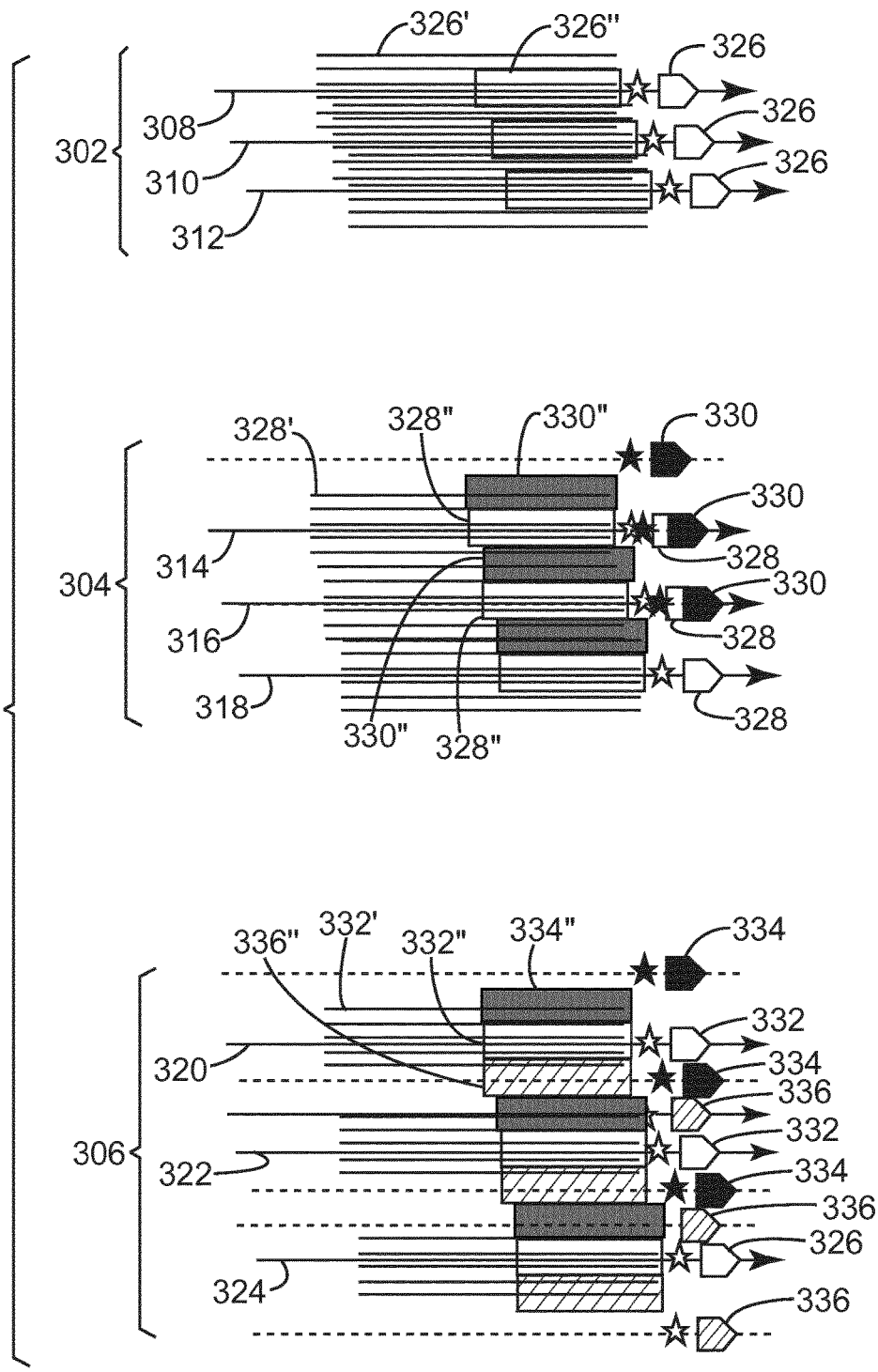

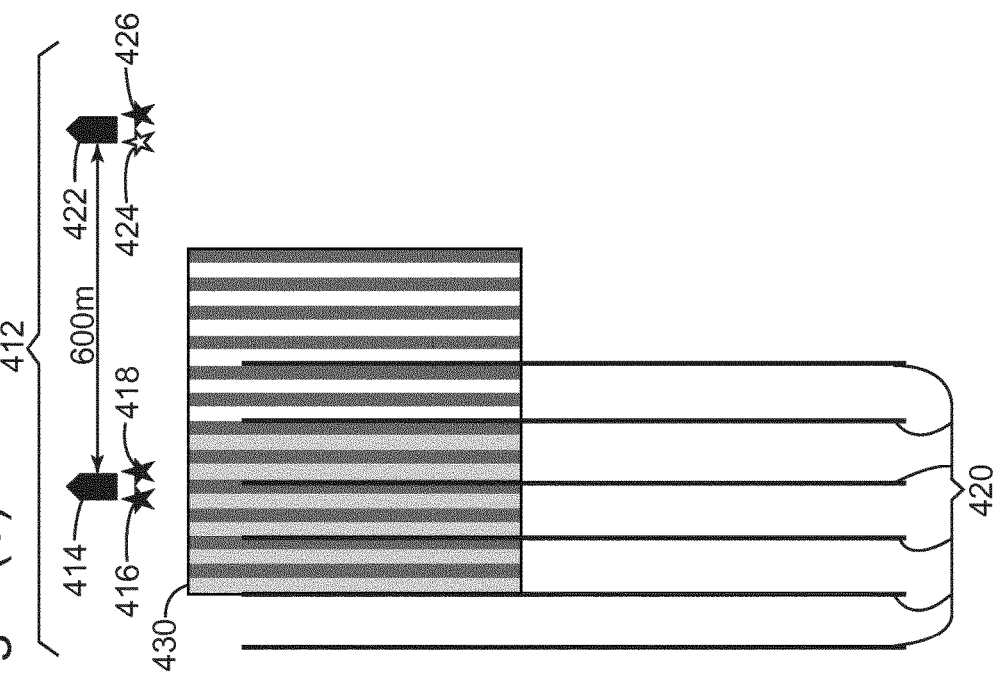
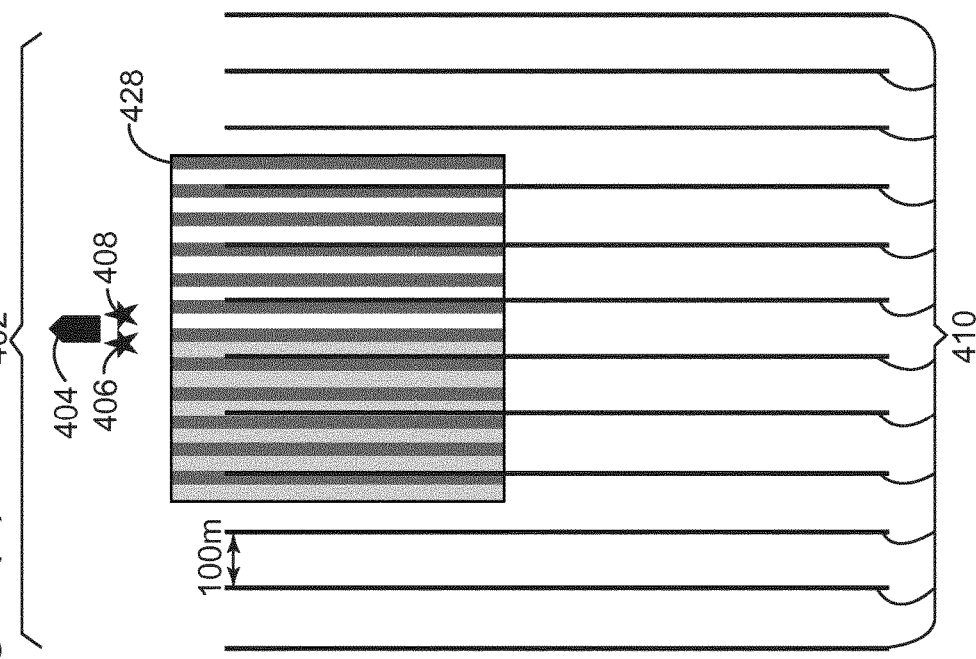

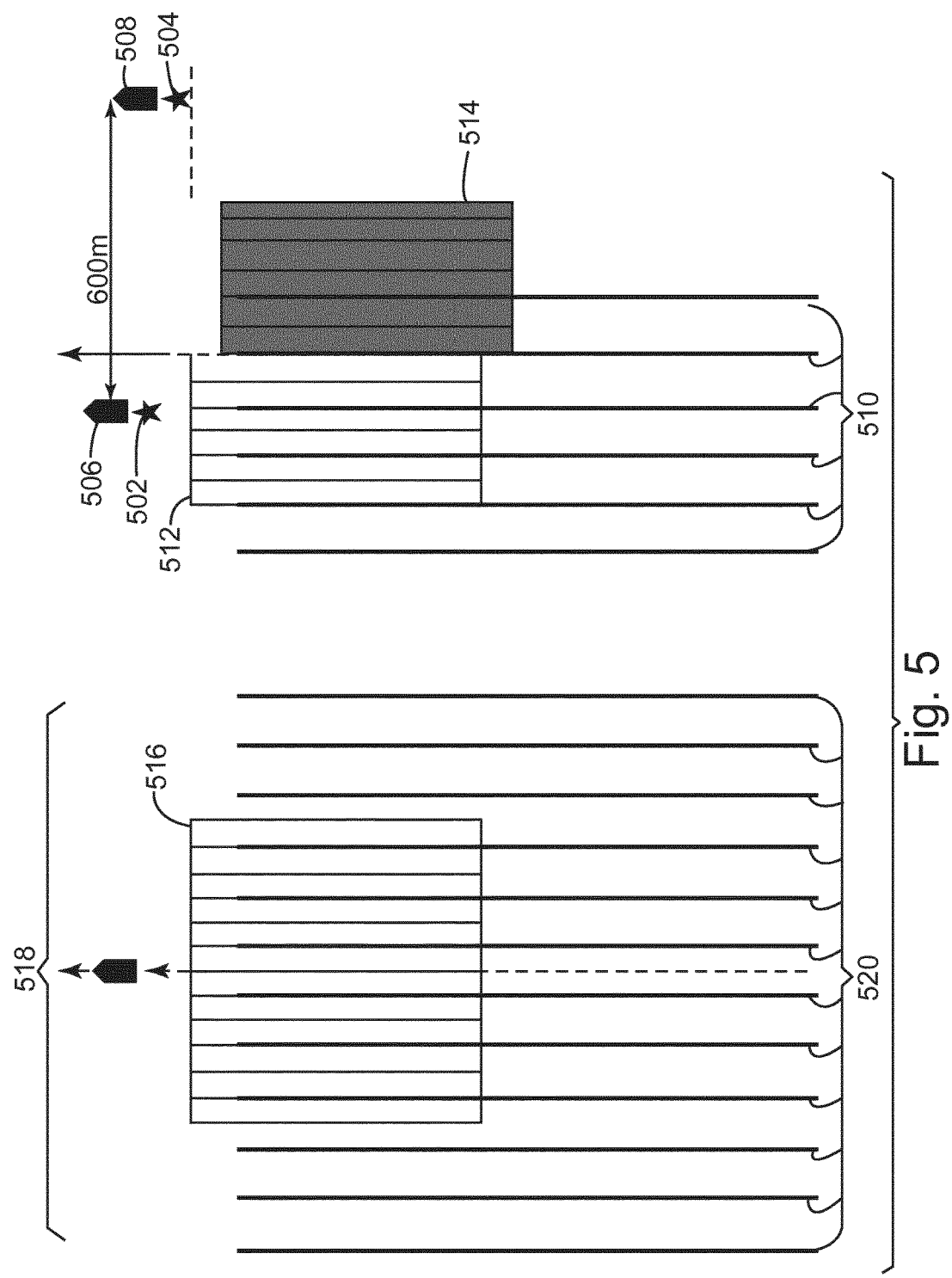

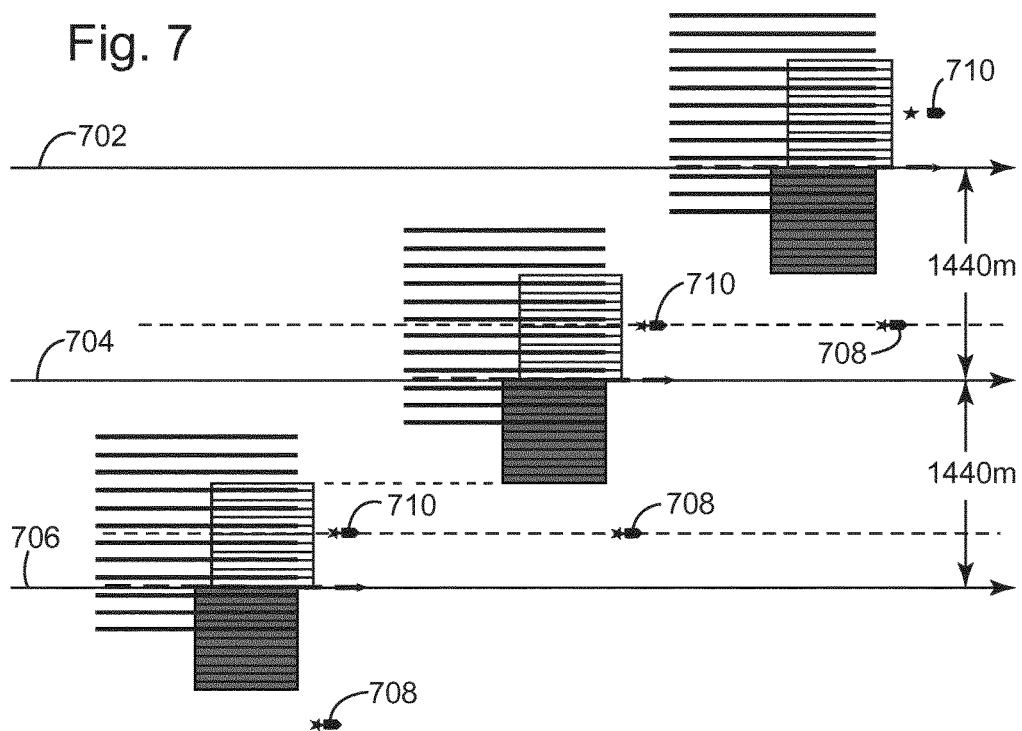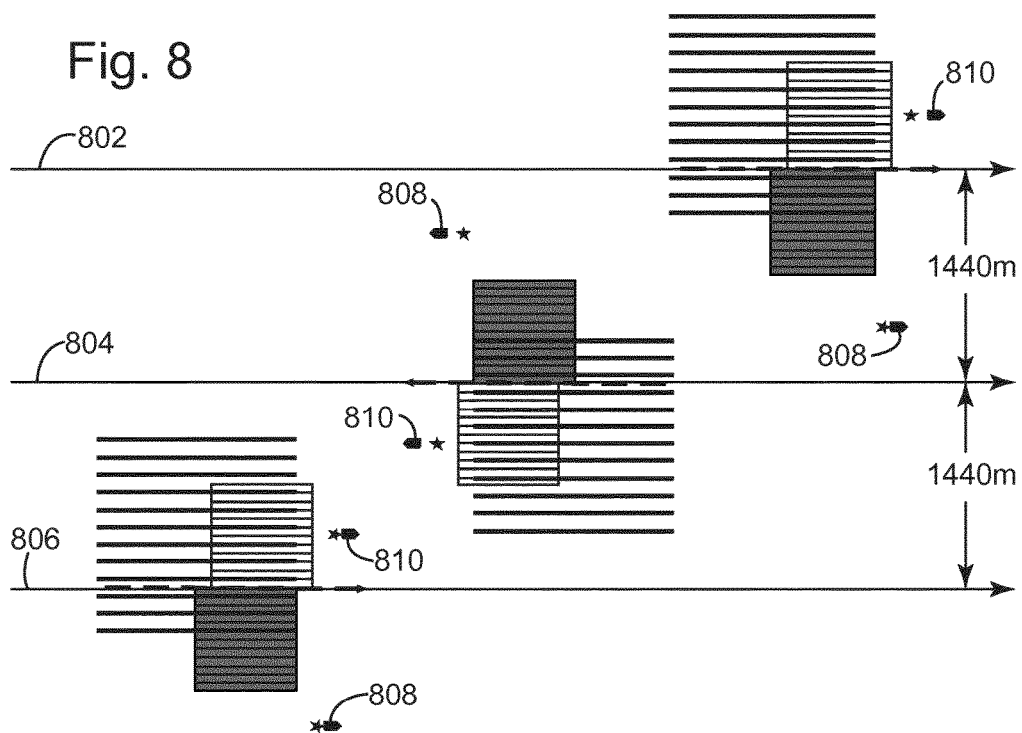

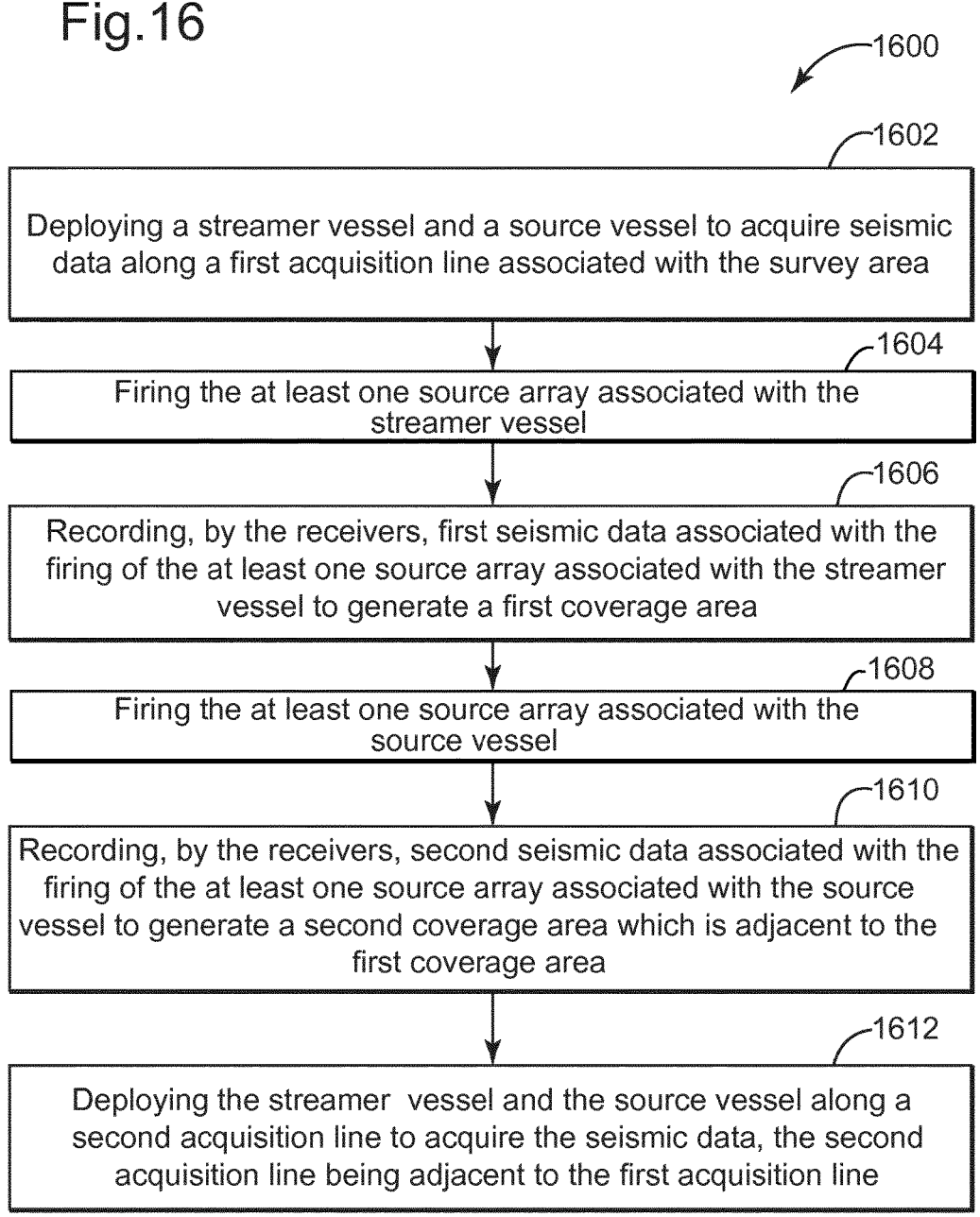

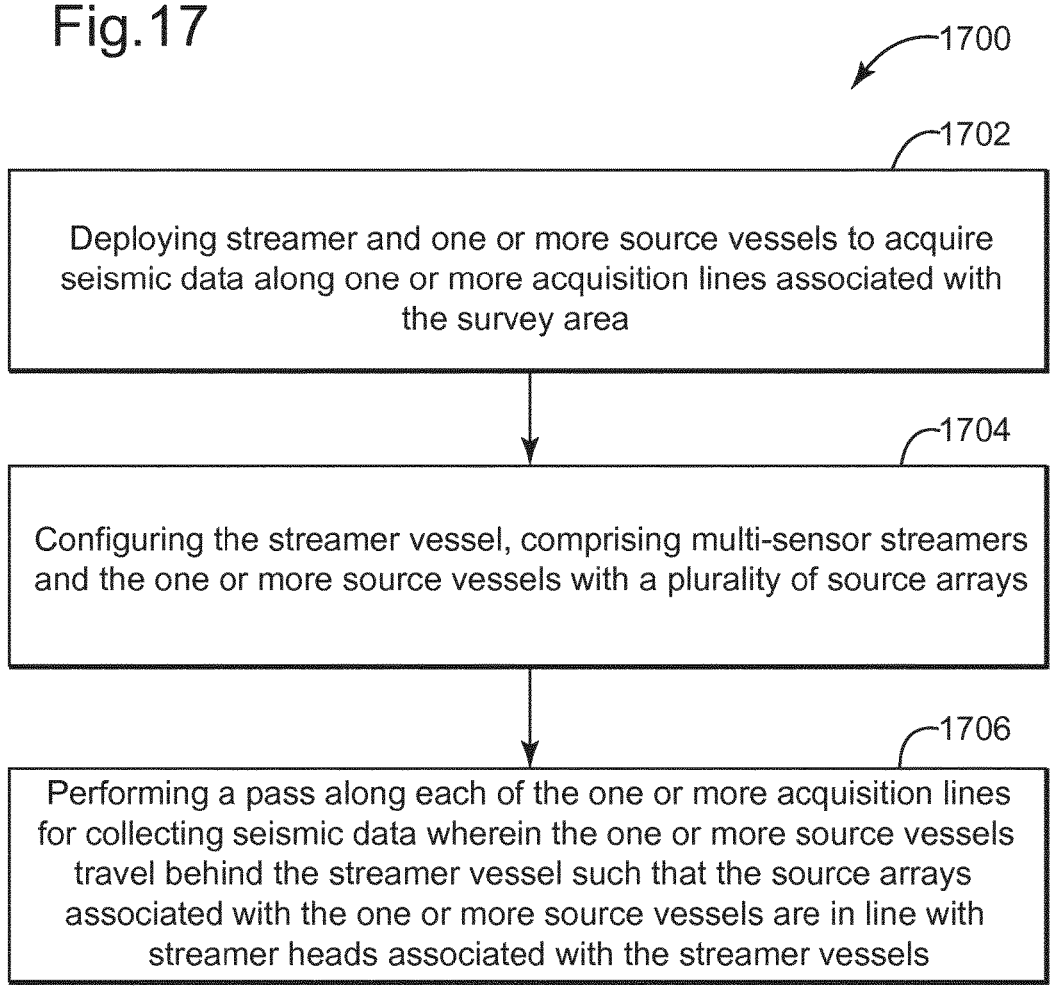

VIRTUAL MARINE SEISMIC SPREAD ACQUISITION

RELATED APPLICATIONS

The present application is related to, and claims priority from U.S. Provisional Patent Application No. 61/832,462, filed Jun. 7, 2013, entitled "VIRTUAL MARINE SEISMIC SPREAD ACQUISITION WITH MULTI-SENSOR STREAMERS," to Thomas MENSCH, Damien GRENIÉ and Risto SILIQI the disclosure of which is incorporated herein by reference. The present application is also related to, and claims priority from U.S. Provisional Patent Application No. 61/954,820, filed Mar. 18, 2014, entitled "METHOD FOR IMPROVING THE PRODUCTIVITY OF MARINE SEISMIC SURVEY", to Thomas MENSCH, the disclosure of which is incorporated herein by reference.

TECHNICAL FIELD

Embodiments of the subject matter disclosed herein generally relate to methods and systems for seismic data acquisition and, more particularly, to methods and systems for collecting seismic data based on reducing survey time by optimizing survey configuration and specific processing.

BACKGROUND

Considering a seismic data acquisition process and system and looking to FIG. 1, a seismic data acquisition system 100 includes a vessel 102 towing a plurality of streamers 104 that can, for example, extend one or more kilometers behind the vessel 102. Each of the streamers 104 can include one or more "birds" 106 that maintain the streamer 104 in a known fixed position relative to other streamers 104. Further, the one or more "birds" 106 are capable of moving the streamers 104 as desired according to bi-directional communications received by the birds 106 from the vessel 102.

One or more source arrays 108 can also be towed by vessel 102, or by another vessel (not shown), for generating seismic waves. Source arrays 108 can be placed either in front of or behind the receivers 112 (only one representative receiver being illustrated per streamer), or both behind and in front of the receivers 112. The seismic waves generated by the source arrays 108 propagate downward, reflect off of, and penetrate the seafloor, wherein the refracted waves eventually are reflected by one or more reflecting structures (not shown in FIG. 1) back to the surface of the sea. The reflected seismic waves then propagate upward and are detected by the receivers 112 disposed on the streamers 104. The seismic waves then reflect off of the free surface, i.e., the surface of the sea, traveling downward and are once again detected by the receivers 112 disposed on streamers 104 as receiver ghosts. This process is generally referred to as "shooting" a particular seafloor area, with the seafloor area referred to as a "cell" and the sea surface referred to as a "free surface."

Conducting a seismic survey is a complicated and expensive operation. As described above, large vessels are involved with complicated maneuvers associated with towing a series of streamers and source arrays, and turning the vessel to make numerous passes through an acquisition area. Further, other vessels can be involved for towing additional source arrays, and it may be necessary to coordinate the travel paths of the entire fleet of vessels. Completing a seismic survey is a function of following a predetermined plan of maneuvers across a large predetermined area of the sea. One way to decrease the time required to complete a seismic survey is to tow a larger number of streamers, corresponding to a larger area of coverage by the streamers, across the predetermined seismic survey area, and then reducing the number of passes.

However, while performing the survey, operational issues can arise such as broken or tangled lines, failed receivers, failed source arrays, etc., wherein the greater complexity of more streamers increases the probability of problems associated with completing the survey. In another aspect, the greater the complexity of the equipment, usually reflected by a larger number of streamers connected to a vessel, the greater the risk of injury to the personnel operating the seismic survey equipment because of the inherent danger of proximity to the operating seismic survey equipment. Additionally, using a large number of streamers may add significant expense as the streamers are themselves quite expensive. Accordingly, it would be desirable to avoid the afore-described problems and drawbacks, and provide systems and methods that collect the required amount of seismic data with a reduced number of streamers and/or in a smaller amount of time.

SUMMARY

According to an embodiment, there is a method for acquiring seismic data over a survey area, the method including deploying a streamer vessel and a source vessel to acquire seismic data along a first acquisition line associated with the survey area, herein the streamer vessel and the source vessel each are configured to have at least one source array and wherein the streamer vessel is also configured to have a plurality of streamers each of which have receivers for recording seismic data, and wherein the source vessel is deployed adjacent to the streamer vessel such that it is offset from the streamer vessel in a cross-line direction relative to the first acquisition line; firing the at least one source array associated with the streamer vessel; recording, by the receivers, first seismic data associated with the firing of the at least one source array associated with the streamer vessel to generate a first coverage area; firing the at least one source array associated with the source vessel; recording, by the receivers, second seismic data associated with the firing of the at least one source array associated with the source vessel to generate a second coverage area which is adjacent to the first coverage area; and deploying the streamer vessel and the source vessel along a second acquisition line to acquire the seismic data, the second acquisition line being adjacent to the first acquisition line, wherein an offset of the second acquisition line relative to the first acquisition line is calculated so that the first coverage area corresponding to the first acquisition line is adjacent to the second coverage area corresponding to the second acquisition line.

According to another embodiment, there is a method for acquiring seismic data over a survey area, the method including deploying a streamer vessel and one or more source vessels to acquire seismic data along one or more acquisition lines associated with the survey area; configuring each of the streamer vessel and the one or more source vessels with one or more source arrays, wherein the streamer vessel has a plurality of streamers and the one or more source vessels either have no streamers or streamers which are shorter than those associated with the streamer vessel; performing a pass along each of the one or more acquisition lines for collecting seismic data wherein the one or more source vessels travel behind the streamer vessel such that the source arrays associated with the one or more source vessels are in line with streamer heads associated with the streamer vessels; and firing a source associated with the streamer vessel and a source associated with each of the one or more source vessels simultaneously and acquiring the seismic data associated with the simultaneous shots, wherein an offset between successive passes is calculated so that a first coverage area corresponding to a first acquisition line is adjacent to the second coverage area corresponding to a second, adjacent, acquisition line, and wherein the first coverage area is achieved by the plurality of streamers and one or more of the source arrays of the streamer vessel, and the second coverage area is achieved by one of the source vessels and its corresponding source array.

According to yet another embodiment, there is a marine seismic acquisition system for collecting seismic data, the system including a streamer vessel configured to tow a plurality of multi-sensor streamers and one or more sources along an acquisition line; one or more source vessels configured to tow one or more sources along a line adjacent, in a cross-line direction, to the streamer vessel and parallel to the acquisition line, wherein the streamer vessel is separated from each of the one or more source vessels by approximately a distance equal to a cross-line width of an associated coverage area; and a controller configured to coordinate source firings by the one or more sources associated with the streamer vessel and the one or more sources associated with the one or more source vessels and to collect seismic blended seismic data associated with the simultaneous firings via the multi-sensor streamers. The associated coverage area corresponds to a first coverage area generated by the one or more sources of the streamer vessel and a second coverage area generated by the one or more sources of the one or more source vessels.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 3 depicts various configurations of streamer vessels and source vessels;

FIGS. 4(a) and 4(b) depict the relationship between a physical large spread and a virtual spread with dual source arrays according to an embodiment, respectively;

FIG. 5 depicts the relationship between a physical large spread and a virtual spread with mono source arrays;

FIG. 7 depicts a virtual large spread acquisition scenario;

FIG. 8 depicts an anti-parallel virtual large spread acquisition scenario;

FIG. 16 is a flowchart for a method for acquiring blended seismic data over a survey area and deblending the blended seismic data;

FIG. 17 is a flowchart for a method for acquiring seismic data over a survey area;

DETAILED DESCRIPTION

Figure 1A:
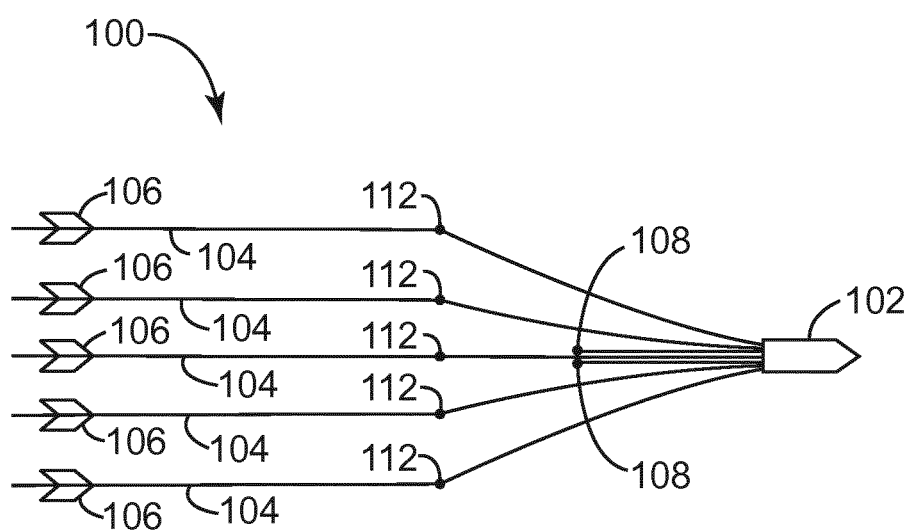
FIG. 1(a) depicts various aspects of an exemplary marine seismic survey system in which described embodiments can be implemented.

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of collecting seismic data based on reducing survey time and/or streamer requirements by optimizing survey configurations and implementing specific processing. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The presented embodiments describe, for example, methods and systems for collecting seismic data based on reducing survey time and/or streamer requirements by optimizing survey configurations and applying specific types of processing to the collected seismic data. The aforementioned survey configuration optimizations are based on, for example, the concept of a virtual spread design. Virtual spread acquisition is, for example, a method according to these embodiments for acquiring, in parallel (or simultaneously), several common midpoint (CMP) "carpets" or swaths (i.e., CMP coverage area) of seismic data using at least one streamer vessel and several source vessels in order to increase the surface of acquisition coverage per period of time. In this context, a period of time corresponds to a full cycle of the sources' firing sequence. Examples of firing sequences in dual vessel configurations include: for two source vessels each having a single source configuration, i.e., vessel 1 having one source S1 and vessel 2 having one source S2, they could be fired in the sequence {S1, S2}, or for two source vessels each having two sources, i.e., vessel 1 having two sources S1 and S2, and vessel 2 having two sources S3, S4, they could be fired in the sequence {S1, S3, S2, S4}. Depending on the chosen shooting strategy (i.e., non-blended acquisition or source-blended acquisition discussed below) the duration/length of the cycle is changed and will mainly impact the fold of the CMP coverage.

For a particular distribution of streamer vessel and source vessels according to various embodiments, adjacent CMP coverage areas can be acquired over the cycle period. For instance sailing a source vessel 122 beside the streamer vessel 120 as shown in FIG. 1(b) allows the acquisition system to have double the surface coverage (represented by the two shaded rectangles 124 and 126) for a given acquisition line, and thus to achieve a CMP surface coverage equivalent to that obtained with a single streamer vessel 130 (FIG. 1(c)) towing a seismic streamer spread having twice as many streamers as the streamer vessel 120 (providing coverage area 132). This virtual spread concept provides efficiency when the design allows for the reduction in acquisition time for achieving equivalent coverage obtained from a regular acquisition spread. Those skilled in the art will appreciate that the virtual spread acquisition can be performed with any type of streamer (e.g., single sensor or multi-sensor streamers), any type of source configuration (e.g., single source arrays or dual source arrays), and any desired shooting strategy (e.g., sequential or simultaneous). Some examples of shooting strategies are provided toward the end of this document.

Figure 2A:
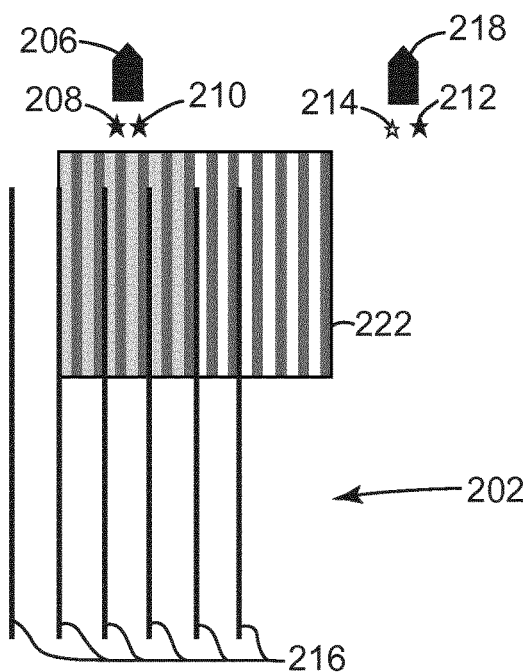
FIGS. 2(a) and 2(b) depict a comparison of a virtual spread according to an embodiment and a supershot, respectively.

The concept of virtual spread configurations according to embodiments can also be understood by way of further examples. For instance, FIG. 2(a) illustrates how two source vessels, one with sources only and another with sources and a streamer spread, provide a virtual streamer spread which is the equivalent of a supershot associated with using only the single streamer and source vessel traversing multiple, parallel acquisition lines and performing multiple shots. More specifically, in FIG. 2(a), the virtual spread acquisition configuration 202 includes a first seismic vessel 206 towing two seismic source arrays 208, 210 and six multi-sensor streamers 216. Those skilled in the art will appreciate that multi-sensor streamers refer to streamers having a plurality of receivers attached thereto some of which includes multiple components, e.g., one or more geophones or accelerometers and/or a hydrophone.

FIG. 2(a) also includes a second source vessel 218 towing a dual source array 212, 214, which travels along a parallel path with the first source vessel 206 separated by the width 220 of the seismic spread, e.g., approximately 600 meters in this example. It should be noted that the seismic source arrays 210, 212 fire (nearly) simultaneously and the seismic source arrays 208, 214 fire (nearly) simultaneously but at different times than the seismic source arrays 210, 212. It should further be noted that, in this context, firing simultaneously can, for example, be considered to be firing the sources such that the received seismic data overlaps and produces a common midpoint (CMP) coverage 222.

Figure 2B:
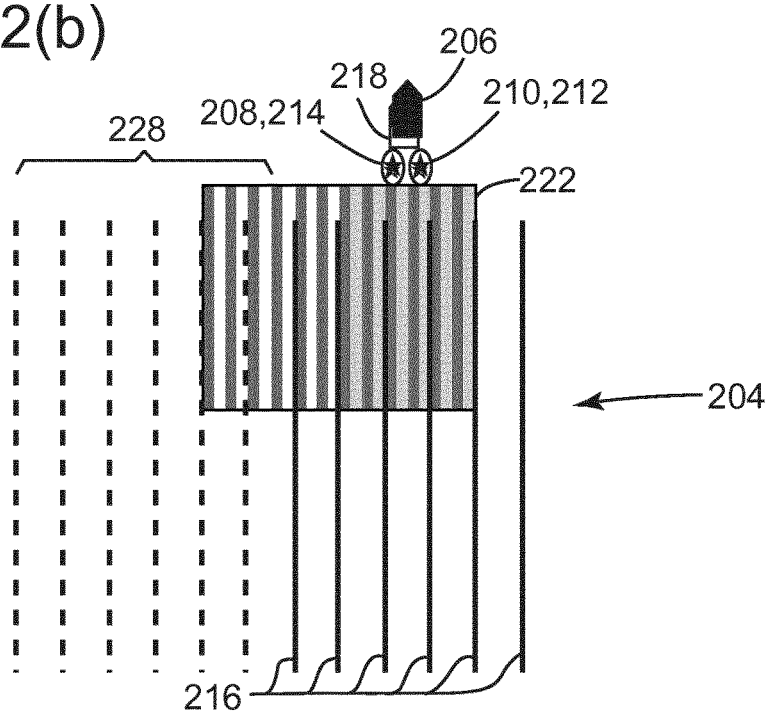

The virtual spread acquisition configuration of FIG. 2(a) provides the equivalent CMP coverage 222 to a supershot acquisition configuration 204, shown in FIG. 2(b). Therein, the single vessel 206 having both sources and streamers traverses two adjacent sail lines and a supershot is reconstructed based on shots acquired by this one vessel. The virtual spread 228, represented by dotted lines in FIG. 2(b), is displayed. This same virtual spread 228 is acquired by the configuration 202 of FIG. 2(a), albeit some additional seismic data processing (described below) is needed to perform the reconstruction. The method is independent of the number of streamers and of the source configuration (one or more sources towed by each vessel).

From the foregoing, it will be appreciated that the use of an extra source vessel 218 in virtual spread acquisition configuration 202 provides for the virtual enlargement of the seismic spread, i.e., by adding one source vessel the common midpoint coverage is multiplied by two. In the alternative, if a third seismic vessel is added to the multi-vessel configuration, e.g., on the other side of the streamer vessel 206, then the common midpoint coverage is multiplied by three. This concept will also be described again below with respect to FIGS. 4(a) and 4(b) relative to the use of additional streamers rather than supershots/additional acquisition lines.

Using one or more additional source boats to improve coverage by way of the afore-described virtual spread technique without using more streamers will improve the speed of the acquisition albeit with some increased cost. Looking to FIG. 3, three seismic acquisition system configurations are depicted with each showing three sail lines. The first configuration 302 depicts one multisensor streamer vessel 326, i.e., a three-dimensional (3D) narrow azimuth (NAZ) configuration and showing three sail lines 308, 310, 312, performing a conventional seismic acquisition. Vessel 326 tows corresponding streamers (that form real spread 326') and the recorded seismic data corresponds to empty rectangle 326", which is the CMP coverage area. Note that successive passes of vessel 326 along sail lines 308, 310 and 312 have the CMP coverage areas 326" adjacent to each other. The second configuration 304 depicts a virtual spread embodiment with one multisensor streamer vessel 328 towing its streamer spread 328' and one source vessel 330 in an asymmetric configuration and three sail lines 314, 316, 318. Note that for this case the CMP coverage area 328" (determined by streamer spread 328' and vessel 328's source) is extended by extended CMP coverage area 330" (determined by streamer spread 328' and vessel 330's source). Thus, the virtual spread embodiment enlarges the overall CMP coverage area by adding the extended CMP coverage area 330" to the CMP coverage area 328". The third configuration 306 depicts another embodiment with one multisensor streamer vessel 332 towing its streamer spread 332' and two source vessels 334, 336 in a symmetric configuration and showing three sail lines 320, 322, 324. Note that for this case the CMP coverage area 332" (determined by streamer spread 332' and vessel 332's source) is extended by first extended CMP coverage area 334" (determined by streamer spread 332' and vessel 334's source) and also by second extended CMP coverage area 336" (determined by streamer spread 332' and vessel 336' source). Thus, the virtual spread embodiment enlarges the overall CMP coverage area by adding the first extended CMP coverage area 334" and the second extended CMP coverage area 336" to the CMP coverage area 332".

A comparison of the second and third configurations 304, 306 with the first configuration 302 illustrates that the second configuration 304 is twice as fast as the first configuration 302 (because the size of the CMP coverage area is doubled) for a given seismic survey while the economic expense is only 25 percent greater than the cost of the first configuration 302. In this regard, note that the second and third configuration use the CMP coverage area and the extended CMP coverage areas for spacing the sail lines 314, 316, and 318, or 320, 322, and 324. In other words, while the traditional configuration 302 tows the physical streamer spread along adjacent sail lines such that the CMP coverage area of the streamer spread for a given sail line is adjacent or overlaps the CMP coverage area of the streamer spread for an adjacent sail line, as illustrated in FIG. 3 by the CMP coverage areas 326" corresponding to vessel 326, the novel configurations 304 or 306 tow the physical streamer spread such that a gap is formed between the CMP coverage area 328" (for vessel 328, or CMP coverage area 332' for vessel 332) of the streamer spread for a given sail line and the next CMP coverage area 328" of an adjacent sail line, as also illustrated in FIG. 3. This is so because of the virtual spread effect, i.e., seismic data is acquired without the need of placing physical streamers over the position of the extended CMP coverage areas. In this way, an adjacent sail line 316 is further apart from a previous sail line 314 than the configuration 302 even if the same number of streamers in the streamer spread is used. Similarly, the third configuration 306 is three times faster than the first configuration 302 (because the overall CMP coverage area is three times as large as CMP coverage area 326") while the economic expense is only 50 percent greater than the cost of the first configuration 302. These cost relationships are based on the assumption that the cost of operating a streamer vessel is about four times that of the cost of operating a source vessel. This embodiment shows that placing more source vessels on the side of the streamer spread increases the number of empty rectangles, i.e., the gap between adjacent sail lines. Note that instead of using CMP coverage area, one skilled in the art may select another criteria, for example, common depth point, common reflection point, etc.

As another way to understand virtual spreads according to embodiments, FIGS. 4(a) and 4(b) illustrate how an acquisition configuration with two source vessels, one of which has a relatively small streamer spread, provide an equivalent seismic acquisition coverage to a single source vessel having a much larger streamer spread. For example, FIG. 4(a) is a depiction of a conventional large spread seismic acquisition system 402 with a streamer vessel 404 towing two source arrays 406, 408 with 12 multisensor streamers 410, whereas FIG. 4(b) is an embodiment of a virtual spread acquisition system 412 with a streamer vessel 414 towing 2 source arrays 416, 418 and 6 multisensor streamers 420 and a source vessel 422 towing 2 source arrays 424, 426. In the embodiment of FIG. 4(b), simultaneous shots are fired from one source array 416 or 418 on the streamer vessel 414 and one source array 424 or 426 on the source vessel 422, respectively, to assure the same shot point and trace density. As shown in FIG. 4(a), the conventional configuration 402 generates a CMP coverage area 428, and in FIG. 4(b) the virtual spread configuration 412 generates a CMP coverage area 430 having substantially the same coverage area as area 428.

In order to obtain this coverage area 430, the embodiment of FIG. 4(b) also performs certain specific processing, e.g., one or more deblending algorithms, on the collected seismic data received from the acquisition configuration 412 to render the deblended seismic data to be equivalent to the data which would have been collected from a mono-vessel acquisition design with twice the number of streamers, i.e., the configuration of FIG. 4(a). For an example of deblending algorithms which can be used to process data received from a virtual spread seismic acquisition system according to these embodiments, the interested reader is referred to U.S. Patent Publication No. 2013/0121110, entitled "Device and Method for De-Blending Simultaneous Shooting data With Apex Shifted Radon Transform", filed on May 10, 2012, the disclosure of which is incorporated here by reference and to U.S. patent application Ser. No. 14/225,488, filed on Mar. 26, 2014 and entitled "Device and Method for De-Blending Simultaneous Shot Data", the disclosure of which is also incorporated here by reference. After deblending the virtual traces look like real traces, and can be processed as conventional seismic data that had been acquired directly via the sensors/receivers on the streamers. Alternatively, it may also be useful to apply other specific processing sequences, such as regularization/interpolation techniques, which take advantage of multicomponent data.

In the previous embodiments, the two vessels associated with the virtual spread, e.g., vessels 414 and 422, are depicted as having multiple sources and travelling parallel to one another in the crossline direction. However these features are not required. Looking now to FIG. 5 and another embodiment, a single source 502, 504 per towing vessel 506, 508 respectively, is depicted. Additionally, in order to optimize the distribution of minimum offsets, the source vessel 508 is slightly staggered, i.e., shifted backwards in an inline direction, from the streamer vessel 506 so the source array 504 is in line with the streamer heads of the streamers 510 towed by the streamer vessel 506. Note that in order to build a regular shot grid, there is a relationship between the position of the sources, i.e., the inline staggered distance between the sources depends on the shot point interval and the shooting sequence. As previously described, this configuration provides a coverage area 512,514 equivalent to that of the coverage area 516 of a configuration 518 comprising twice the number of streamers 520.

Figure 6:
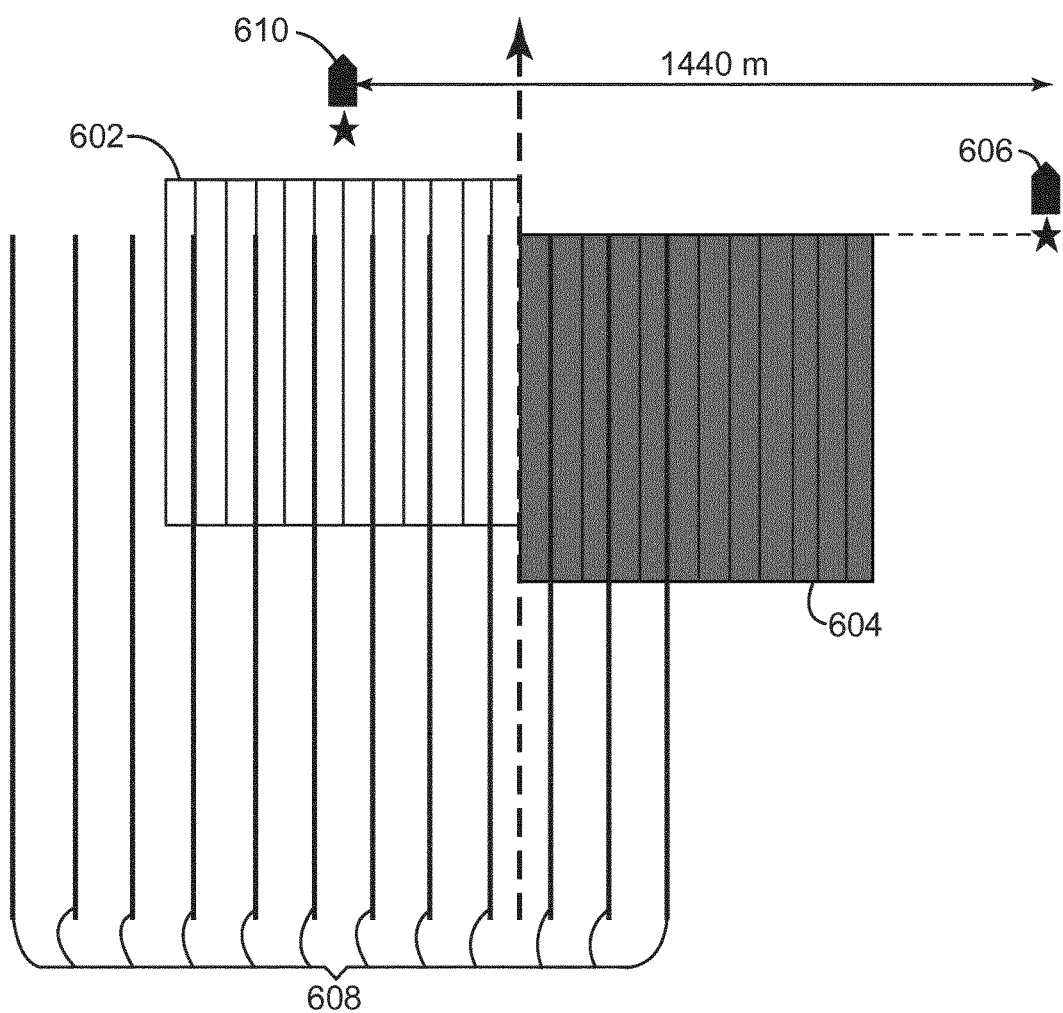
FIG. 6 depicts a virtual large spread.

In a similar fashion as that described for FIG. 5, wherein the number of streamers can be cut in half by adding a source tow vessel, the coverage area can be doubled, i.e., adding coverage area 604 to coverage area 602, by adding a source vessel 606 to operate in conjunction with the streamer vessel 610 without reducing the number of streamers 608 as depicted in the embodiment of FIG. 6.

Expanding on the configuration described in FIG. 6, FIG. 7 depicts a 3-pass 702, 704, 706 virtual spread acquisition wherein the cross-line spread is 1,440 meters, i.e., twice the cross-line spread of a configuration without the source vessel 708. It should be noted that each pass of the virtual spread acquisition system is in the same direction in this embodiment and the source vessel 708 remains on the starboard side of the streamer vessel 710. In an alternative configuration, depicted in FIG. 8, another 3-pass 802, 804, 806 virtual spread acquisition configuration is depicted. As described for FIG. 7, the coverage area is twice the cross-line distance of an acquisition configuration without the source vessel 808. It should be noted that alternative passes in this embodiment, e.g., pass 804, are in the opposite direction of the adjacent passes 802, 806 creating an anti-parallel configuration. It should further be noted that the source vessel 808 remains on the starboard side of the streamer vessel 810 regardless of the direction of the vessels 808, 810.

Figure 9:
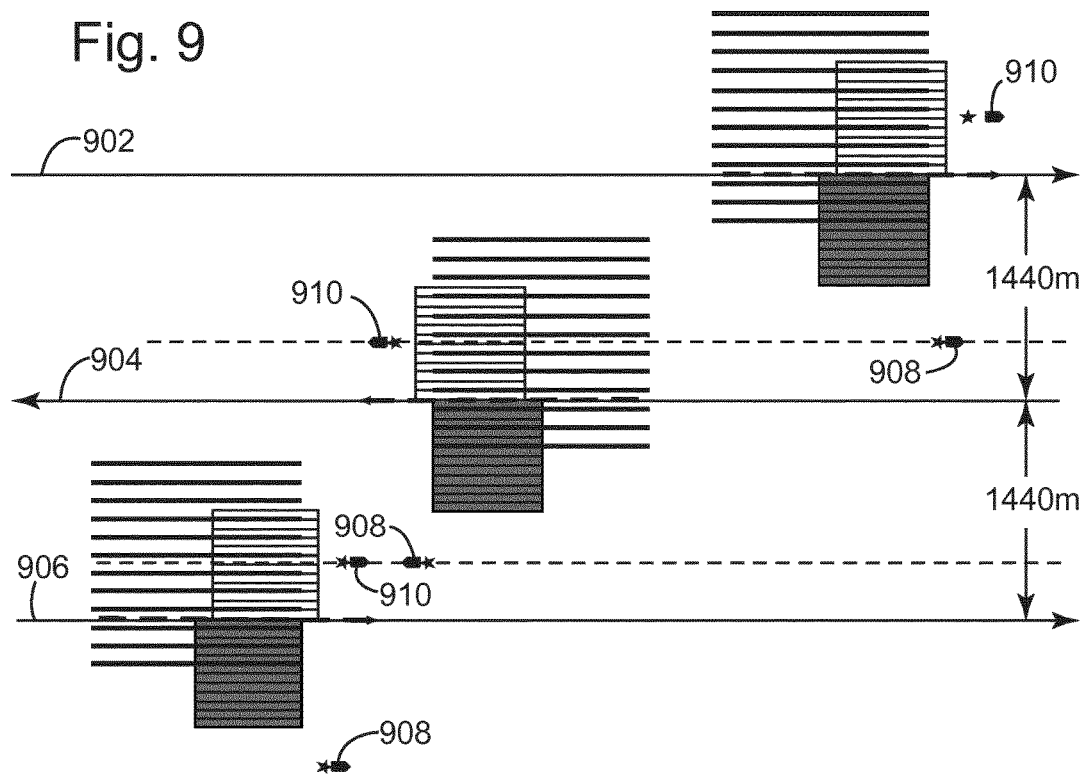
FIG. 9 depicts an anti-parallel virtual large spread acquisition scenario with vessel swapping.

Looking to another alternative configuration depicted in FIG. 9 is three passes 902, 904, 906 of a virtual spread acquisition configuration. As described in FIG. 8, this alternative is an anti-parallel configuration with alternating passes, e.g., the second pass 904, in an opposite direction from the adjacent passes 902, 906. It should be noted in this configuration that the source vessel 908 alternates from the starboard side of the streamer vessel 910 to the port side of the streamer vessel 910 on adjacent passes.

Although the previously described configurations provide for doubling the size of the acquisition area and reducing the survey time by 50% or reducing the streamer requirements by 50% while maintaining the same survey time, there are tradeoffs with respect to seismic data quality. In one aspect associated with the use of a single source array configuration for preserving fold, the bin size, i.e., resolution, of a virtual spread acquisition configuration is twice as large as a bin size for a single vessel with a dual source array configuration. In another aspect related to reducing the acquisition time by 50% while keeping the same shooting rate, e.g., 25 meter shot point interval, the shot point density is decreased and resulting in a lower fold and a possible decrease in the signal-to-noise ratio of the seismic data. Further, processing of the seismic data associated with scalar common offset can become more complicated based on the lack of near offsets associated with the mimicked extra-large spreads of a virtual spread acquisition configuration.

Improving the resolution, i.e., reducing the bin size, can be accomplished by using dual source arrays on the vessels as described previously and/or by reducing the shot point interval, e.g., from 25 meters to 18.5 meters, to increase the fold. It should be noted however that reducing the shot point interval should be balanced against the length of a clean record, i.e., the length of time between the overlap of shots, based on the depth of the survey location.

There may also be issues to consider with regard to the acquisition footprint when applying virtual spreads according to these embodiments. For example, the maximum minimum offset associated with a virtual spread configuration may be greater than that for a corresponding, ideal extra-large spread (i.e., a comparable acquisition configuration using more streamers on the streamer vessel). Thus virtual spreads, like extra-large spreads, may suffer from a lack of near offsets which can make the azimuthal distribution more complex which, in turn, may make the subsequent processing of the acquired seismic data more complicated. This issue can be addressed by, for example, minimizing the asymmetry of the super shot associated with the virtual spread acquisition configuration, as depicted in FIG. 10, by reducing the distance between the streamer vessel 1002 and the source vessel 1004 and creating coverage overlap 1006.

It should be noted that with overlap coverage in the virtual spread embodiment on the right-hand side of the figure, the streamer vessel 1002 and the source vessel 1004 will not travel the same acquisition line but the coverage will still match that of a single vessel with 10 streamers 1008 with the use of 6 streamers 1010 on the virtual spread acquisition configuration streamer vessel 1002. The amount of coverage overlap can be increased or decreased to provide varying degrees of efficiency improvement relative to conventional configurations which do not employ the virtual spread techniques described herein.

Figure 10:
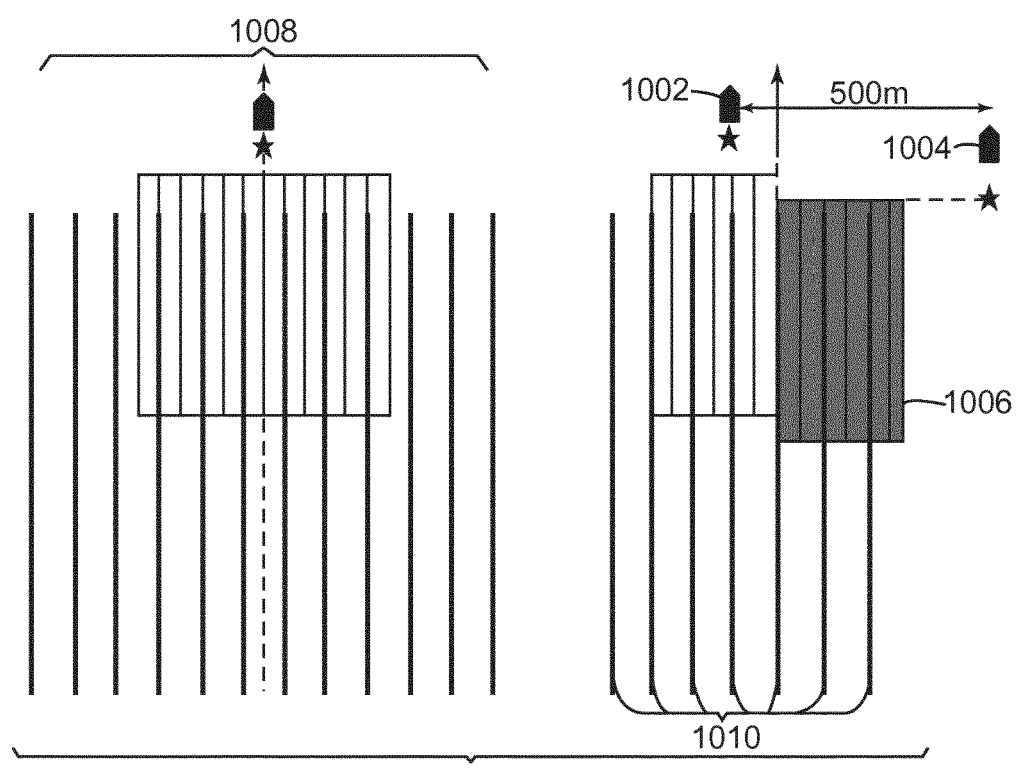
FIG. 10 depicts the relationship between a physical large spread and a virtual spread with mono source arrays and coverage area overlap.
Figure 11:
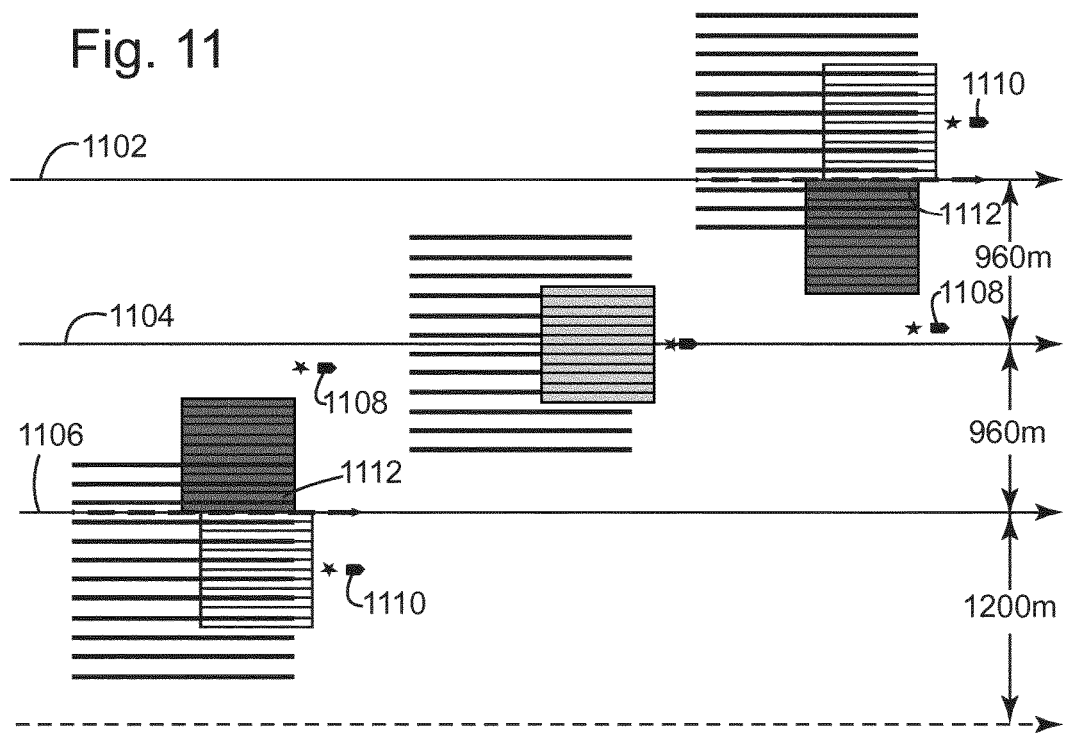
FIG. 11 depicts a virtual large spread acquisition scenario with overlap and passes of different types.

For example, and expanding on the configuration described in FIG. 10, FIG. 11 depicts a 3-pass 1102, 1104, 1106 hybrid virtual spread acquisition wherein the cross-line spread is variable based on the use of a mixture of a virtual spread acquisition configuration passes 1102, 1104 and a conventional single vessel acquisition pass 1104. It should be noted that on alternating passes of the virtual spread acquisition configuration, the source vessel 1108 alternates from the starboard side of the streamer vessel 1110 to the port side of the streamer vessel. It should further be noted that the configuration, with a 33% coverage overlap 1112, provides a 44% gain in efficiency over a conventional configuration. Also note that in this and other embodiments, while it is preferred that the CMP coverage areas from one pass to another are adjacent to each other along the cross-line direction, it is also possible to have a partial overlap between the coverage area from a previous pass and the coverage area from a next pass.

Figure 12:
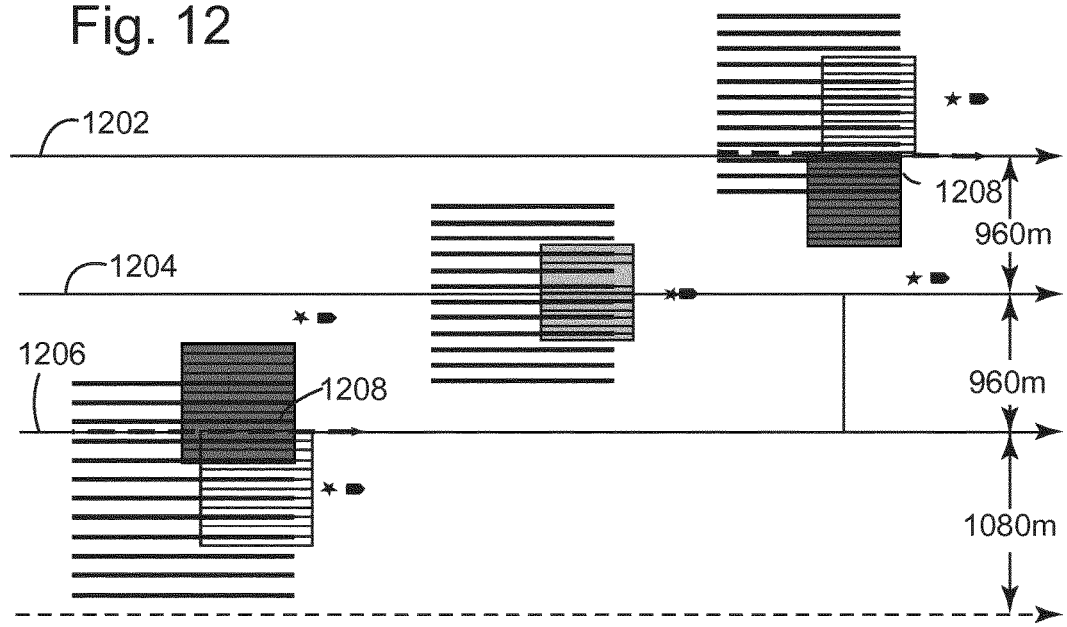
FIG. 12 depicts a virtual large spread acquisition scenario with greater overlap and passes of different types.
Figure 13:
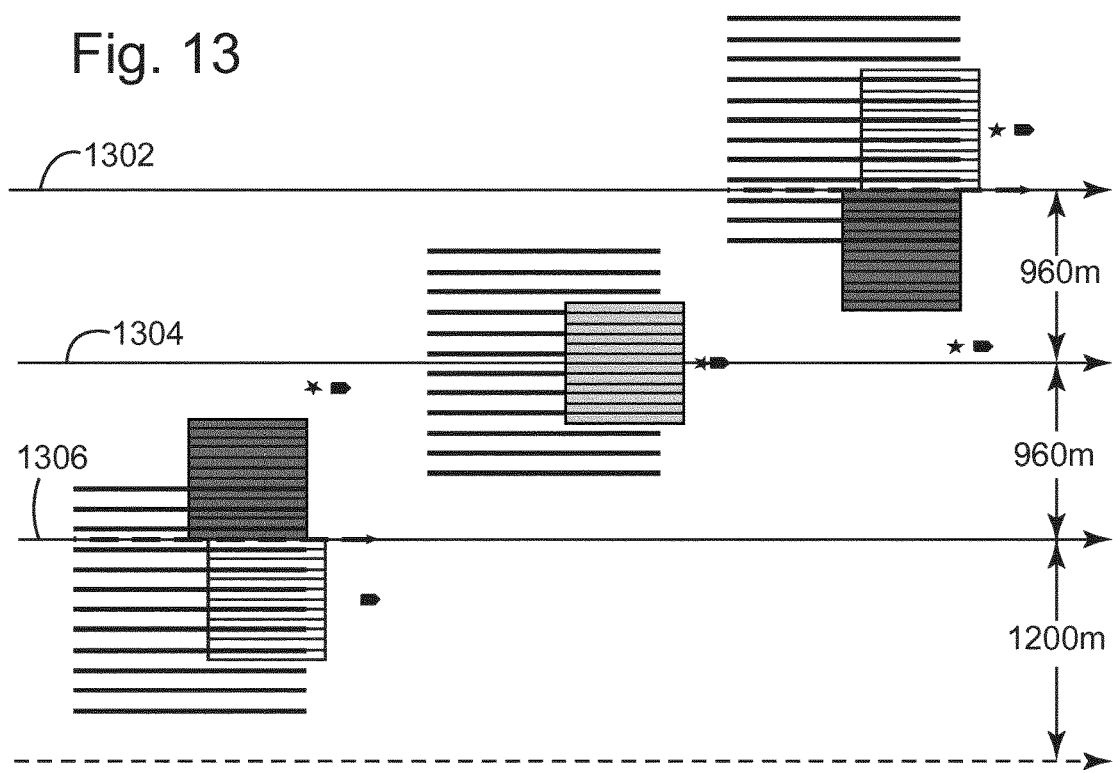
FIG. 13 depicts a virtual large spread acquisition scenario with no overlap and passes of different types.

In an alternative configuration depicted in FIG. 12, another 3-pass 1202, 1204, 1206 hybrid virtual spread acquisition configuration is depicted. The configuration in FIG. 12 is identical to that described for FIG. 11 with the exception that the coverage overlap 1208 is 50% for passes 1202 and 1206. It should be noted that the configuration shown in FIG. 12, with a 50% coverage overlap 1208, provides a 33% gain in efficiency over conventional configurations which do not employ virtual spread techniques. Looking to another alternative configuration depicted in FIG. 13 three passes 1302, 1304, 1306 of a hybrid virtual spread acquisition configuration are depicted. The configuration in FIG. 113 is similar to the configurations depicted in FIGS. 11 and 12 except there is no coverage overlap. It should be noted that this configuration provides a 66% gain in efficiency over a conventional configuration.

Figure 14:
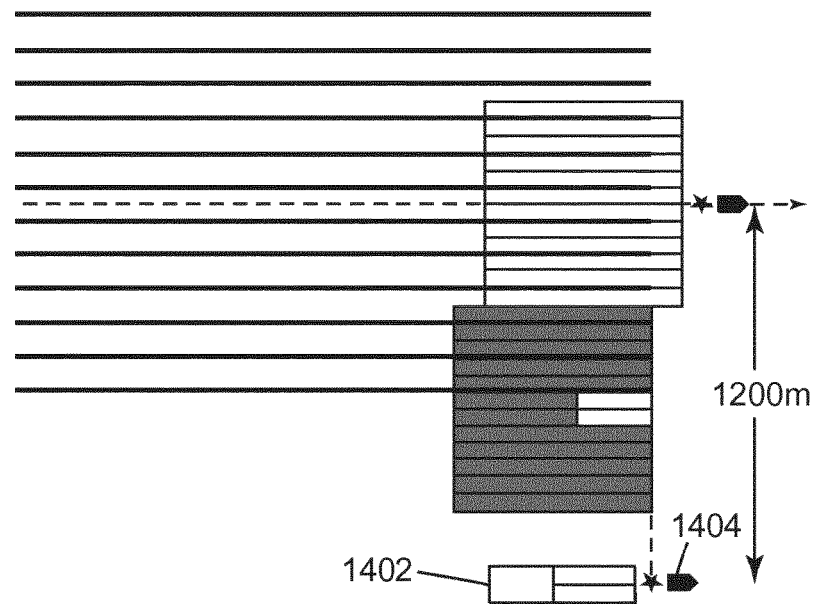
FIG. 14 depicts a virtual large spread acquisition scenario with the source vessel towing a small number of shortened streamers.
Figure 15A:
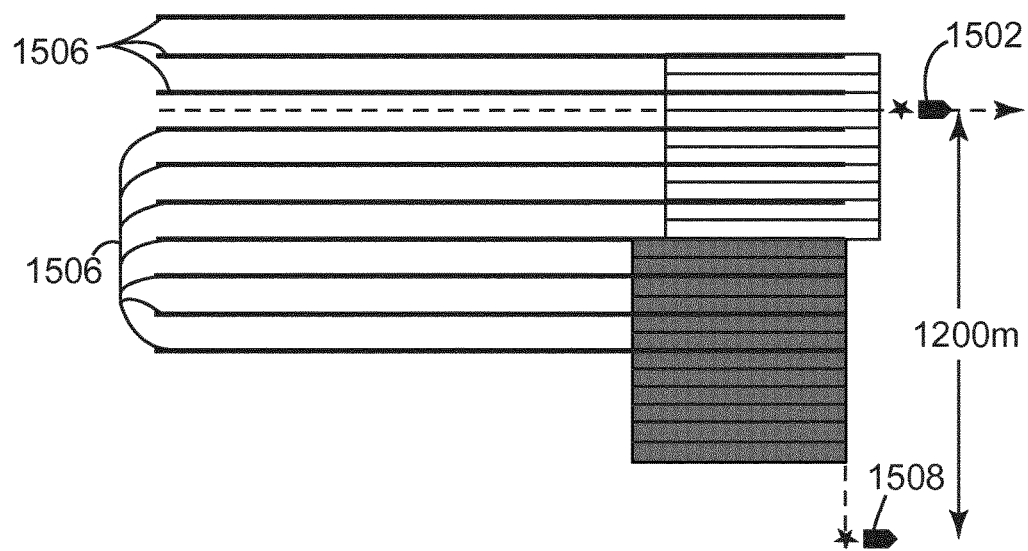
FIG. 15(a) depicts a virtual large spread acquisition scenario with an asymmetrical streamer spread.
Figure 15B:
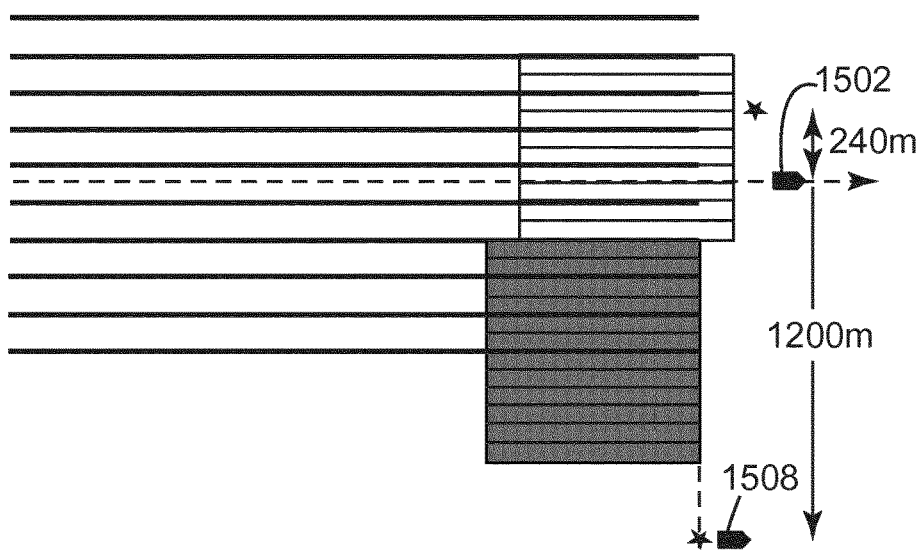
FIG. 15(b) depicts the virtual large spread acquisition scenario of FIG. 15(a) with the streamer source in a different position.

Another configuration providing for mitigating the acquisition footprint and the non-uniform distribution of near-offsets is depicted in FIG. 14 and is based on adding streamers 1402 to the source vessel 1404. It should be noted that for operational and health, safety and environmental (HSE) considerations, the number of streamers 1402 is low and the streamer lengths are short. For example, in the embodiment of FIG. 14, the source vessel 1404 is towing two streamers 1402 and their length is 2000 meters. Acquisition footprint mitigation can further be performed by configuring the seismic spread to be asymmetrical as depicted in FIG. 15(a). This configuration relies on the streamer vessel 1502 not being centered between the towed streamers 1504, 1506, e.g., 3 streamers 1504 on the port side of the streamer vessel 1502 and 7 streamers 1506 on the starboard side of the streamer vessel 1502. It should be noted that the larger group of streamers 1506 is on the side of the streamer vessel 1502 adjacent to the source vessel 1508. A similar result for mitigating supershot asymmetry can be achieved by shifting the seismic source 1510 towed by the streamer vessel 1502 (compare FIG. 15(b) with FIG. 15(a)).

The previously described improvements comprising coverage overlap, streamers attached to a source vessel and asymmetrical streamer configuration can be used independently or in combination with each other to improve the quality of the collected seismic data. Further, the above described configurations are compatible with other acquisition technologies such as, but not limited to, a variable depth streamer broadband configuration, a fanning mode streamer configuration, a multi-sensor streamer configuration and simultaneous sources for any of the single source configurations, i.e., a blended acquisition, matched with deblending processing of the collected seismic data. These embodiments may also be modified, to improve/refine the quality of the seismic data, by acquiring later in time (e.g., after the end of the survey) new seismic data for certain portions of the initial survey area or for the entire survey area, with a mirror configuration, e.g., by swapping the streamer and source vessels. For example, with regard to FIGS. 15(a) and 15(b) discussed above, it is possible to acquire new seismic data by having the source vessel 1508 following the streamer's vessel 1502 path and vice versa. The same or a different firing sequence may be used for the additional seismic survey.

Looking now to FIG. 16, a method 1600 for acquiring seismic data over a survey area according to an embodiment is depicted. At step 1602, the method 1600 deploying a streamer vessel (328) and a source vessel (330) to acquire seismic data along a first acquisition line (314) associated with the survey area. The streamer vessel (328) and the source vessel (330) each are configured to have at least one source array and the streamer vessel (328) is also configured to have a plurality of streamers (328') each of which has receivers for recording seismic data. The source vessel (330) is deployed adjacent to the streamer vessel (328) such that it is offset from the streamer vessel (328) in a cross-line direction relative to the first acquisition line (314). The method also includes a step 1604 of firing the at least one source array associated with the streamer vessel (328); a step 1606 of recording, by the receivers, first seismic data associated with the firing of the at least one source array associated with the streamer vessel (328) to generate a first coverage area (328"); a step 1608 of firing the at least one source array associated with the source vessel (330); a step 1610 of recording, by the receivers, second seismic data associated with the firing of the at least one source array associated with the source vessel (330) to generate a second coverage area (330") which is adjacent to the first coverage area (328"); and a step 1612 of deploying the streamer vessel (328) and the source vessel (330) along a second acquisition line (316) to acquire the seismic data, the second acquisition line (316) being adjacent to the first acquisition line (314). An offset of the second acquisition line (316) relative to the first acquisition line (314) is calculated so that the first coverage area (328") corresponding to the first acquisition line (314) is adjacent to the second coverage area (330") corresponding to the second acquisition line (316).

Considering FIG. 17, another method 1700 for acquiring seismic data over a survey area is depicted. Starting at step 1702, the method 1700 deploys multi-sensor streamers and one or more source vessels to acquire seismic data along one or more acquisition lines associated with the survey area. Next at step 1704, the method 1700 configures a streamer vessel, including the multi-sensor streamers, and the one or more source vessels with one or more source arrays. Continuing at step 1706, the method 1700 performs a pass along each of the one or more acquisition lines for collecting seismic data where the one or more source vessels travel behind the streamer vessel such that the source arrays associated with the one or more source vessels are in line with streamer heads associated with the streamer vessels.

Figure 18:
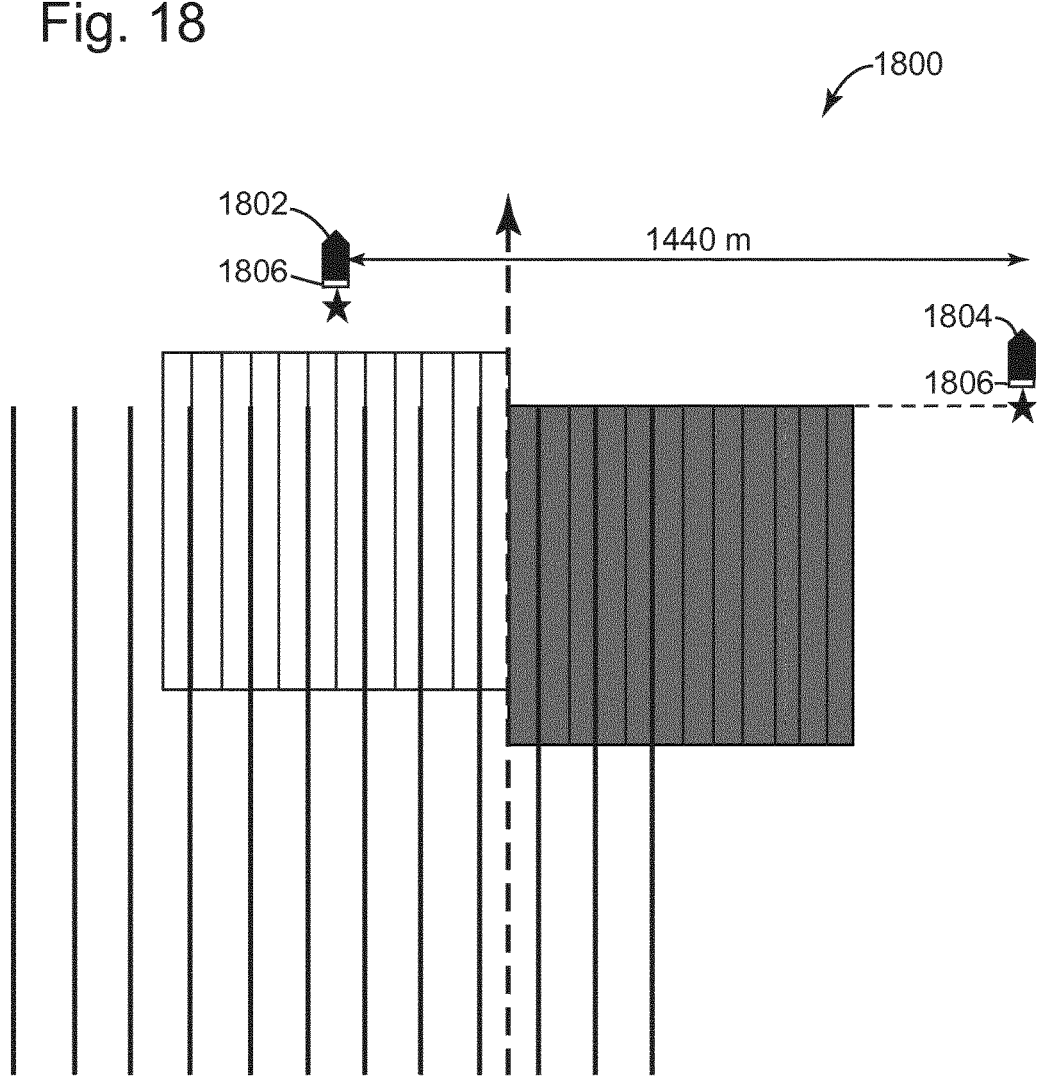
FIG. 18 is a schematic diagram of a marine seismic system for collecting seismic data.

Looking to FIG. 18, a marine seismic acquisition system 1800 for collecting seismic data comprises a streamer vessel 1802, one or more source vessels 1804, and a controller 1806. The streamer vessel 1802 is configured to tow a plurality of multi-sensor streamers and one or more sources along an acquisition line. Next, the one or more source vessels 1804 are configured to tow one or more sources along a line adjacent, in a cross-line direction, to the streamer vessel and parallel to the acquisition line wherein the streamer vessel is separated from each of the one or more source vessels by approximately a distance equal to a cross-line width of an associated coverage area. The controller 1806 provides the capability to direct the streamer and the source vessels along their respective paths and for coordinating source firings for collecting seismic data or blended seismic data.

Figure 19:
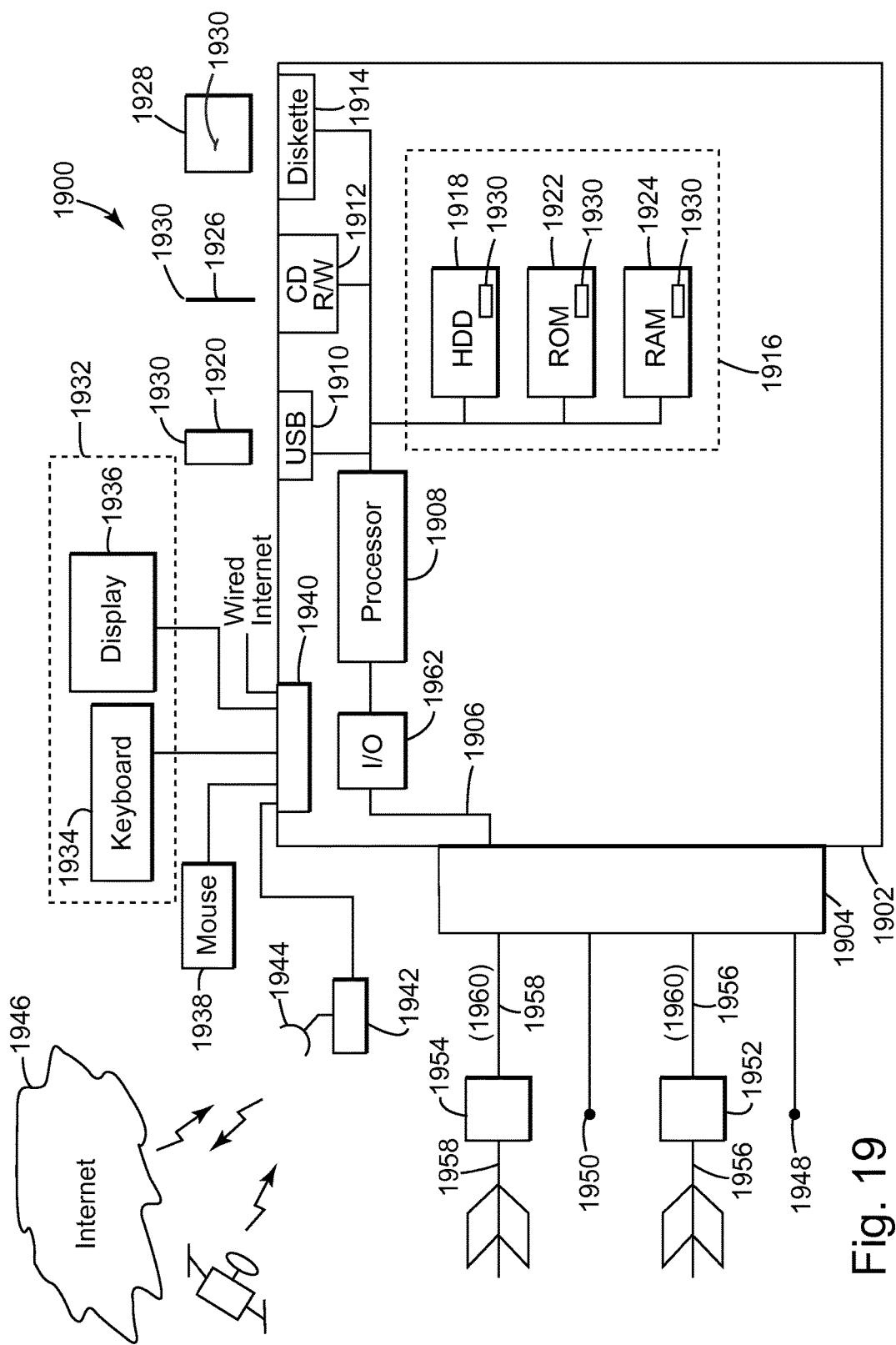
FIG. 19 illustrates a data processing device or system which can be used to implement the deblending processing.

The computing device(s) or other network nodes involved in the deblending of blended seismic data as set forth in the above described embodiments may be any type of computing device capable of processing and communicating seismic data associated with a seismic survey. An example of a representative computing system capable of carrying out operations in accordance with these embodiments is illustrated in FIG. 19. System 1900 includes, among other items, server 1902, source/receiver interface 1904, internal data/communications bus (bus) 1906, processor(s) 1908 (those of ordinary skill in the art can appreciate that in modern server systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application), universal serial bus (USB) port 1910, compact disk (CD)/digital video disk (DVD) read/write (R/W) drive 1912, floppy diskette drive 1914 (though less used currently, many servers still include this device), and data storage unit 1916.

Data storage unit 1916 itself can comprise hard disk drive (HDD) 1918 (these can include conventional magnetic storage media, but, as is becoming increasingly more prevalent, can include flash drive-type mass storage devices 1920, among other types), ROM device(s) 1922 (these can include electrically erasable (EE) programmable ROM (EEPROM) devices, ultra-violet erasable PROM devices (UVPROMs), among other types), and random access memory (RAM) devices 1924. Usable with USB port 1910 is flash drive device 1920, and usable with CD/DVD R/W device 1912 are CD/DVD disks 1926 (which can be both read and writeable). Usable with diskette drive device 1914 are floppy diskettes 1928. Each of the memory storage devices, or the memory storage media (1918, 1920, 1922, 1924, 1926, and 1928, among other types), can contain parts or components, or in its entirety, executable software programming code (software) 1930 that can implement part or all of the portions of the method described herein. Further, processor 1908 itself can contain one or different types of memory storage devices (most probably, but not in a limiting manner, RAM memory storage media 1924) that can store all or some of the components of software 1930.

In addition to the above described components, system 1900 also comprises user console 1932, which can include keyboard 1934, display 1936, and mouse 1938. All of these components are known to those of ordinary skill in the art, and this description includes all known and future variants of these types of devices. Display 1936 can be any type of known display or presentation screen, such as liquid crystal displays (LCDs), light emitting diode displays (LEDs), plasma displays, cathode ray tubes (CRTs), among others. User console 1932 can include one or more user interface mechanisms such as a mouse, keyboard, microphone, touch pad, touch screen, voice-recognition system, among other inter-active inter-communicative devices.

User console 1932, and its components if separately provided, interface with server 1902 via server input/output (I/O) interface 1940, which can be an RS232, Ethernet, USB or other type of communications port, or can include all or some of these, and further includes any other type of communications means, presently known or further developed. System 1900 can further include communications satellite/global navigation satellite system (GNSS)/global positioning system (GPS) transceiver device 1942, to which is electrically connected at least one antenna 1944 (according to an embodiment, there would be at least one GPS receive-only antenna, and at least one separate satellite bi-directional communications antenna). System 1900 can access internet 1946, either through a hard wired connection, via I/O interface 1940 directly or wirelessly via antenna 1944, and transceiver 1942.

Figure 1B:
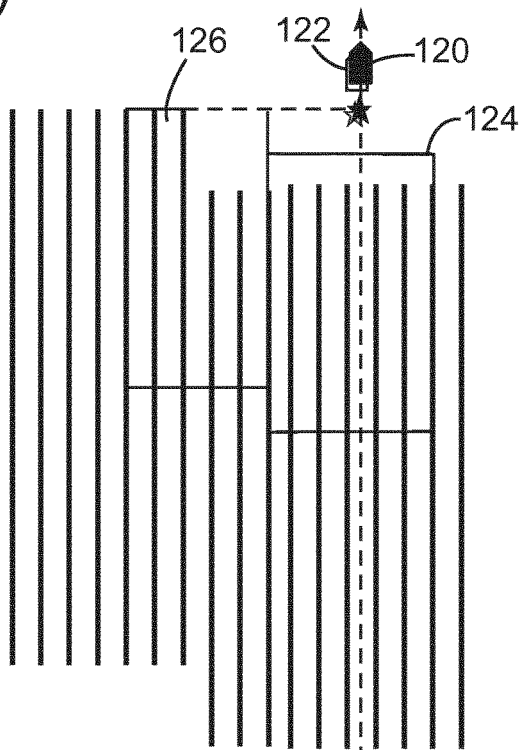
FIGS. 1(b) and 1(c) depict a comparison of a virtual spread according to an embodiment, and a large streamer spread, respectively.
Figure 1C:
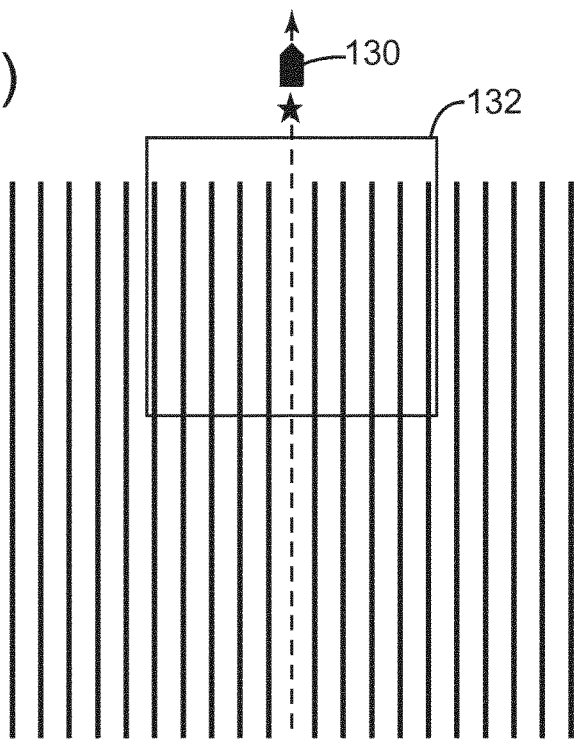

Server 1902 can be coupled to other computing devices, such as those that operate or control the equipment of vessel 102 of FIG. 1, via one or more networks. Server 1902 may be part of a larger network configuration as in a global area network (GAN) (e.g., internet 1946), which ultimately allows connection to various landlines.

According to a further embodiment, system 1900, being designed for use in seismic exploration, will interface with one or more source arrays 1948, 1950 and one or more receivers 1952, 1954. As further previously discussed, sources 1948, 1950 and receivers 1952, 1954 can communicate with server 1902 either through an electrical cable that is part of streamer 1956, 1958, or via a wireless system that can communicate via antenna 1944 and transceiver 1942 (collectively described as communications conduit 1960).

According to further exemplary embodiments, user console 1932 provides a means for personnel to enter commands and configuration into system 1900 (e.g., via a keyboard, buttons, switches, touch screen and/or joy stick). Display device 1936 can be used to show: source/receiver 1956, 1958 position; visual representations of acquired data; source 1948, 1950 and receiver 1952, 1954 status information; survey information; and other information important to the seismic data acquisition process. Source and receiver interface unit 1904 can receive the seismic data from receiver 1952, 1954 though communication conduit 1960 (discussed above). Source and receiver interface unit 1904 can also communicate bi-directionally with sources 1948, 1950 through the communication conduit 1960. Excitation signals, control signals, output signals and status information related to source 1948, 1950 can be exchanged by communication conduit 1960 between system 1900 and source 1948, 1950.

Bus 1906 allows a data pathway for items such as: the transfer and storage of data that originate from either the source sensors or receivers through an I/O processor 1962; for processor 1908 to access stored data contained in data storage unit memory 1916; for processor 1908 to send information for visual display to display 1936; or for the user to send commands to system operating programs/software 1930 that might reside in either the processor 1908 or the source and receiver interface unit 1904.

System 1900 can be used to implement the methods described above associated with reducing cross-term interference associated with a time-frequency analysis of seismic data according to an exemplary embodiment. Hardware, firmware, software or a combination thereof may be used to perform the various steps and operations described herein. According to an exemplary embodiment, software 1930 for carrying out the above discussed steps can be stored and distributed on multi-media storage devices such as devices 1918, 1920, 1922, 1924, 1926, and/or 1928 (described above) or other form of media capable of portably storing information (e.g., universal serial bus (USB) flash drive 1920). These storage media may be inserted into, and read by, devices such as the CD-ROM drive 1912, the disk drive 1914, among other types of software storage devices.

As mentioned above, different shooting strategies can be used in conjunction with the above described virtual spread acquisition embodiments, including shooting strategies associated with non-blending seismic data acquisition and blended seismic data acquisition. For non-blended acquisition, the sources are activated sequentially with a sufficient amount of time between two successive shots to avoiding the use of a dedicated source separation algorithm for retrieving the contribution of each shot (i.e., no overlap of the seismic data).

Figure 20A:
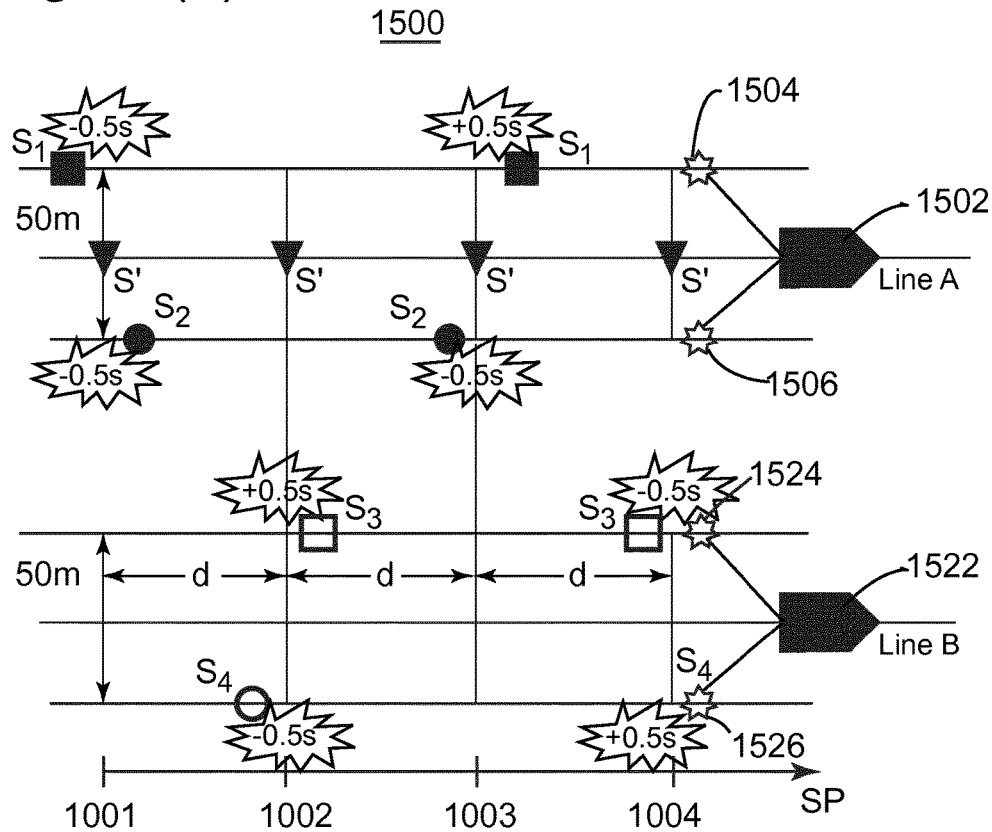
FIGS. 20(a) and 20(b) depict a shooting strategy associated with a blended acquisition according to an embodiment.
Figure 20B:
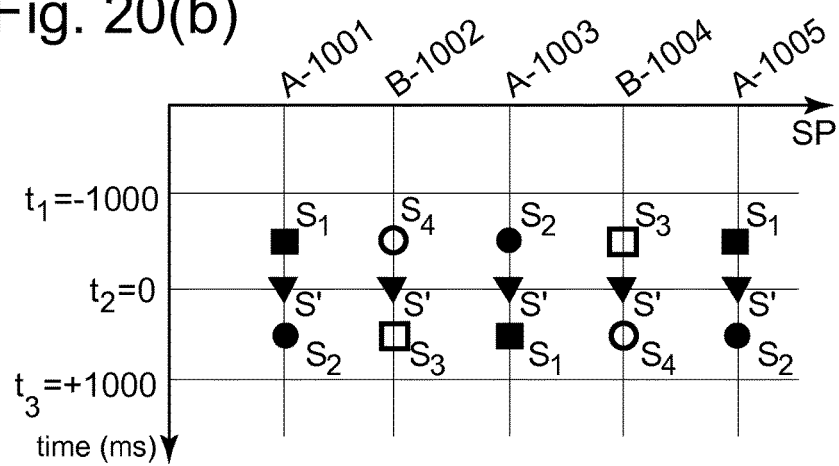

Alternatively, for blended acquisition (i.e., wherein the sources are fired simultaneously or substantially simultaneously), the seismic data are blended because the sources are activated more often. Several shooting strategies for acquiring blended data can be used, e.g., fire sources exactly simultaneously, firing sources simultaneously with dithering, or firing sources distributed in time with optional dithering. FIGS. 20(*a*)-(*b*) and 21(*a*)-(*b*) depict examples of blended acquisition shooting strategies involving two vessels each of which have two sources.

Figure 21A:
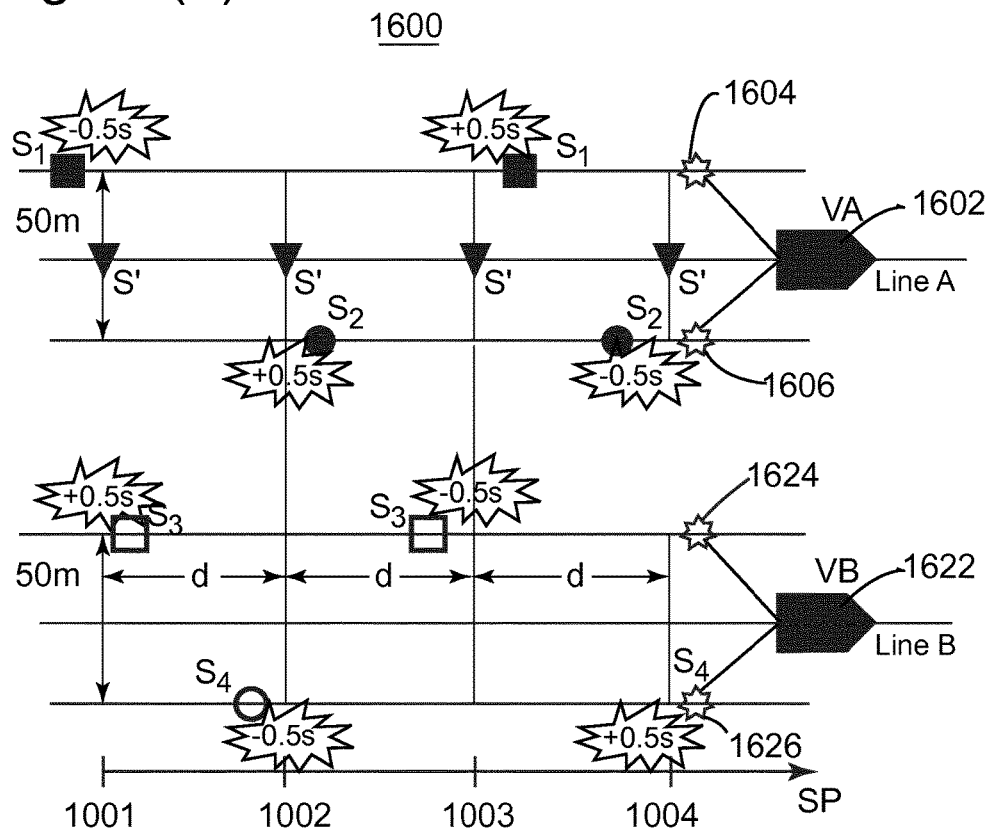
FIGS. 21(a) and 21(b) depict a shooting strategy associated with a blended acquisition according to another embodiment.
Figure 21B:
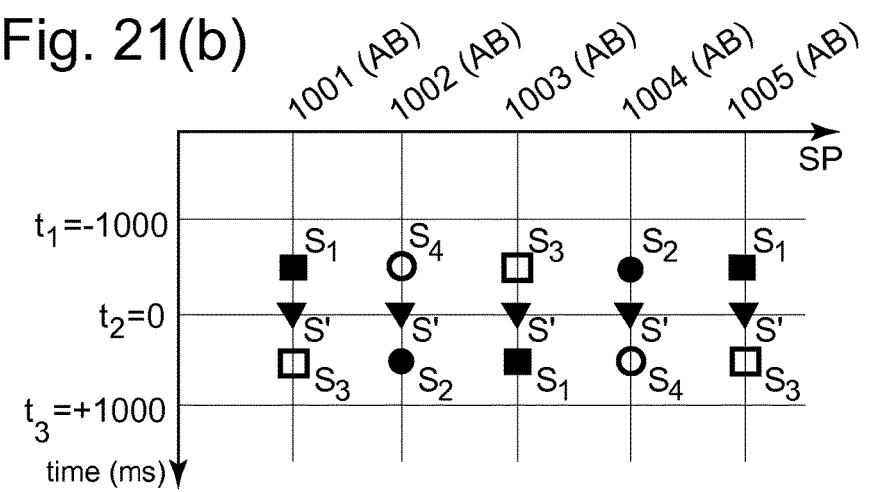

More specifically, FIGS. 20(*a*) and 20(*b*) depict an example of a shooting strategy for blended acquisition in a dual vessel (VA, VB) configuration (with dual source per vessel, i.e., S1 and S2 for VA and S3 and S4 for VB) where the two sources towed by the same vessel (VA or VB) are actuated nearly simultaneously. The time delay δt (with respect to the theoretical location S') is defined by the user and may change from one shot point to another point. FIGS. 21(*a*) and 21(*b*) depict another example of a shooting strategy for blended acquisition using the same dual vessel configuration (with dual source per vessel) as in FIGS. 20(*a*) and 20(*b*), but where only one of the sources towed by each vessel are actuated nearly simultaneously.

Depending on the selected acquisition mode, different processing strategies will be applied. Or, alternatively depending on the selected processing strategy, a specific acquisition mode will be used. As mentioned above, these virtual spread acquisition techniques enable one to obtain an equivalent acquisition (in terms of fold and number of traces (i.e., pairs of source-receiver)) relative to extra-large spread single vessel acquisition can be obtained with a dual source vessel configuration combined with the use of simultaneous source technology. However the data will be different in terms of illumination, i.e., the distribution of offset/azimuth, which may require the use of dedicated processing algorithms such as data regularization techniques.

The disclosed exemplary embodiments provide a server node, and a method for reducing cross-term interference associated with a time-frequency analysis of seismic data. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for acquiring seismic data over a survey area, the method comprising:
    deploying a streamer vessel and a source vessel to acquire seismic data along a first acquisition line associated with the survey area,
    wherein the streamer vessel and the source vessel each are configured to have at least one source array and wherein the streamer vessel is also configured to have a plurality of streamers each of which have receivers for recording seismic data, and
    wherein the source vessel is deployed adjacent to the streamer vessel such that it is offset from the streamer vessel in a cross-line direction relative to the first acquisition line;
    firing the at least one source array associated with the streamer vessel;
    recording, by the receivers, first seismic data associated with the firing of the at least one source array associated with the streamer vessel to generate a first coverage area;
    firing the at least one source array associated with the source vessel;
    recording, by the receivers, second seismic data associated with the firing of the at least one source array associated with the source vessel to generate a second coverage area which is adjacent to the first coverage area; and
    deploying the streamer vessel and the source vessel along a second acquisition line to acquire (1) third seismic data associated with a firing of the at least one source array associated with the streamer vessel to generate a third coverage area and (2) fourth seismic data associated with a firing of the at least one source array associated with the source vessel to generate a fourth coverage area which is adjacent to the third coverage area, the second acquisition line being adjacent to the first acquisition line,
    wherein an offset of the second acquisition line relative to the first acquisition line is calculated so that (i) the first coverage area corresponding to the streamer vessel moving along the first acquisition line is adjacent to the fourth coverage area corresponding to the source vessel moving along the second acquisition line and (ii) the fourth coverage area is sandwiched between the first and third coverage areas with no gap or overlap between the first, third and fourth coverage areas.

2. The method of claim 1, wherein the two firing steps are performed simultaneously or substantially simultaneously and the method further comprising the step of:
    applying a deblending algorithm to the first seismic data and the second seismic data to separate the first seismic data and the second seismic data associated with each simultaneous shot, respectively.

3. The method of claim 1, wherein the receivers are multi-sensor receivers.

4. The method of claim 1, wherein the source vessel is separated from the streamer vessel by approximately a width of the streamer spread towed by the streamer vessel.

5. The method of claim 1, wherein the first coverage area is common midpoint coverage area.

6. The method of claim 1, wherein each pass along alternating acquisition lines is in opposite directions.

7. The method of claim 1, wherein the source vessel alternates from the starboard side to the port side of the streamer vessel on alternating acquisition lines.

8. The method of claim 1, wherein alternating passes use a combination streamer and source vessel for one pass and only a streamer vessel for the other pass.

9. The method of claim 8, wherein the combination streamer and source vessel passes have overlapping coverage areas based on the source vessel moving closer to the streamer vessel.

10. The method of claim 1, wherein the source vessel is deployed ahead of, or behind, the streamer vessel in the inline direction.

11. The method of claim 1, wherein the at least one source array associated with the streamer vessel and the at least one source array associated with the source vessel are fired sequentially.

12. The method of claim 11, wherein the source vessel is ahead of the streamer vessel.

13. The method of claim 1, wherein the first coverage area and the second coverage area are each one-half the width of the streamer spread towed by the streamer vessel.

14. The method of claim 1, further comprising:
    acquiring additional seismic data over at least a part of the survey area by using the streamer vessel and the source vessel in a swapped arrangement.

15. A method for acquiring seismic data over a survey area, the method comprising:
    deploying a streamer vessel and one or more source vessels to acquire seismic data along one or more acquisition lines associated with the survey area;
    configuring each of the streamer vessel and the one or more source vessels with one or more source arrays, wherein the streamer vessel has a plurality of streamers and the one or more source vessels either have no streamers or streamers which are shorter than those associated with the streamer vessel;
    performing a pass along each of the one or more acquisition lines for collecting seismic data wherein the one or more source vessels travel behind the streamer vessel such that the source arrays associated with the one or more source vessels are in line with streamer heads associated with the streamer vessels; and
    firing a source associated with the streamer vessel and a source associated with each of the one or more source vessels simultaneously and acquiring the seismic data associated with the simultaneous shots,
    wherein an offset between successive passes is calculated so that (i) a first coverage area corresponding to the streamer vessel moving along a first acquisition line is adjacent to a fourth coverage area corresponding to the one or more source vessels moving along a second, adjacent, acquisition line, and (ii) the fourth coverage area is sandwiched between the first coverage area and a third coverage area, with no gap or overlap between the first, third and fourth coverage areas, and
    wherein the first coverage area is achieved by the plurality of streamers and one or more of the source arrays of the streamer vessel along the first acquisition line, a second coverage area is achieved by one of the source vessels and its corresponding source array along the first acquisition line, the third coverage area is achieved by the plurality of streamers and the one or more of the source arrays of the streamer vessel along the second acquisition line, and the fourth coverage area is achieved by the one of the source vessels and its corresponding source array along the second acquisition line.

16. The method of claim 15, wherein the one or more source vessels remain cross-line adjacent to the streamer vessel and separated by a cross-line distance of approximately a cross-line width of streamer spread and behind the streamer vessel such that the one or more source arrays are in line with streamer heads.

17. The method of claim 15, wherein each pass along each acquisition line is in the same direction.

18. The method of claim 15, wherein the one source vessel alternates from the starboard side to the port side of the streamer vessel on alternating acquisition lines.

19. The method of claim 15, wherein alternating passes use a combination streamer and source vessel for one pass and only a streamer vessel for the other pass.

20. A marine seismic acquisition system for collecting seismic data, the system comprising:

a streamer vessel configured to tow a plurality of multi-sensor streamers and one or more sources along a first acquisition line;

one or more source vessels configured to tow one or more sources along a line adjacent, in a cross-line direction, to the streamer vessel and parallel to the acquisition line, wherein the streamer vessel is separated from each of the one or more source vessels by approximately a distance equal to a cross-line width of an associated coverage area; and a controller configured to coordinate source firings by the one or more sources associated with the streamer vessel and the one or more sources associated with the one or more source vessels and to collect seismic blended seismic data associated with the simultaneous firings via the multi-sensor streamers, wherein the associated coverage area for the first acquisition line corresponds to (1) a first coverage area generated by the one or more sources of the streamer vessel and (2) a second coverage area generated by the one or more sources of the one or more source vessels, wherein an associated coverage area for a second, adjacent, acquisition line corresponds to (3) a third coverage area generated by the one or more sources of the streamer vessel and (4) a fourth coverage area generated by the one or more sources of the one or more source vessels, and wherein an offset of the second acquisition line relative to the first acquisition line is calculated so that (i) the first coverage area corresponding to the streamer vessel moving along the first acquisition line is adjacent to the fourth coverage area corresponding to the one or more source vessels moving along the second acquisition line and (ii) the fourth coverage area is sandwiched between the first and third coverages areas with no gap or overlap between the first, third and fourth coverage areas.

* * * * *